United States Patent
Seo et al.

(10) Patent No.: US 10,333,671 B2
(45) Date of Patent: Jun. 25, 2019

(54) METHOD FOR TRANSMITTING AND RECEIVING SIGNAL BASED ON SHARED RESOURCE IN WIRELESS COMMUNICATION SYSTEM, AND APPARATUS THEREFOR

(71) Applicant: LG ELECTRONICS INC., Seoul (KR)

(72) Inventors: Hanbyul Seo, Seoul (KR); Kijun Kim, Seoul (KR); Hakseong Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/564,164

(22) PCT Filed: Apr. 6, 2016

(86) PCT No.: PCT/KR2016/003574
§ 371 (c)(1),
(2) Date: Oct. 3, 2017

(87) PCT Pub. No.: WO2016/163738
PCT Pub. Date: Oct. 13, 2016

(65) Prior Publication Data
US 2018/0083751 A1 Mar. 22, 2018

Related U.S. Application Data

(60) Provisional application No. 62/272,066, filed on Dec. 28, 2015, provisional application No. 62/245,293, (Continued)

(51) Int. Cl.
*H04L 5/00* (2006.01)
*H04L 27/26* (2006.01)
(Continued)

(52) U.S. Cl.
CPC .......... *H04L 5/0048* (2013.01); *H04L 5/0037* (2013.01); *H04L 27/26* (2013.01);
(Continued)

(58) Field of Classification Search
CPC ......... H04L 5/0048; H04L 5/00; H04L 27/26; H04W 72/0466; H04W 72/04;
(Continued)

(56) References Cited

U.S. PATENT DOCUMENTS

2004/0190493 A1   9/2004   Yao et al.
2011/0237267 A1*  9/2011   Chen ...................... H04J 11/003
                                                                455/450
(Continued)

FOREIGN PATENT DOCUMENTS

EP          2571182         3/2013
WO          2014051494      4/2014

OTHER PUBLICATIONS

PCT International Application No. PCT/KR2016/003574, Written Opinion of the International Searching Authority dated Jul. 26, 2016, 24 pages.

(Continued)

*Primary Examiner* — Afshawn M Towfighi
(74) *Attorney, Agent, or Firm* — Lee, Hong, Degerman, Kang & Waimey

(57) ABSTRACT

A method for transmitting and receiving a signal based on a shared resource according to one embodiment of the present invention is provided, wherein configuration information about the shared resource can be received from a base station, a reference signal for uplink data can be generated, and the reference signal for transmitting the uplink data of the shared resource can be mapped to a resource unit and the (Continued)

same can be generated based on a specific sequence in a reference signal sequence set that is assigned with respect to the shared resource.

13 Claims, 15 Drawing Sheets

Related U.S. Application Data filed on Oct. 23, 2015, provisional application No. 62/196,310, filed on Jul. 24, 2015, provisional application No. 62/158,541, filed on May 8, 2015, provisional application No. 62/143,788, filed on Apr. 6, 2015.

(51) Int. Cl.
  *H04W 72/04* (2009.01)
  *H04W 88/02* (2009.01)
  *H04W 88/08* (2009.01)
(52) U.S. Cl.
  CPC ....... *H04W 72/04* (2013.01); *H04W 72/0466* (2013.01); *H04L 5/0016* (2013.01); *H04W 88/02* (2013.01); *H04W 88/08* (2013.01)
(58) Field of Classification Search
  CPC .... H04W 88/08; H04W 88/02; Y02D 70/126; Y02D 70/25
  See application file for complete search history.

(56) References Cited

U.S. PATENT DOCUMENTS

| 2013/0022012 A1* | 1/2013 | Lee ................... H04W 52/0216 370/329 |
| 2013/0039285 A1 | 2/2013 | Sorrentino |
| 2014/0241194 A1* | 8/2014 | Zhou ..................... H04L 5/0057 370/252 |
| 2014/0254530 A1* | 9/2014 | Kim ...................... H04L 5/0019 370/329 |
| 2015/0341132 A1* | 11/2015 | Hwang ................ H04L 5/0048 370/329 |
| 2016/0227517 A1* | 8/2016 | Han ...................... H04W 72/04 |

OTHER PUBLICATIONS

NEC, "Uplink Reference Signal Enhancement for MTC", 3GPP TSG RAN WG1 Meeting #80, R1-150289, Feb. 2015, 4 pages.
ETRI, "Considerations on Uplink Reference Signal for MTC", 3GPP TSG RAN WG1 Meeting #79, R1-144916, Nov. 2014, 3 pages.
European Patent Office Application Serial No. 16776841.5, Search Report dated Nov. 2, 2018, 9 pages.

\* cited by examiner

FIG. 1
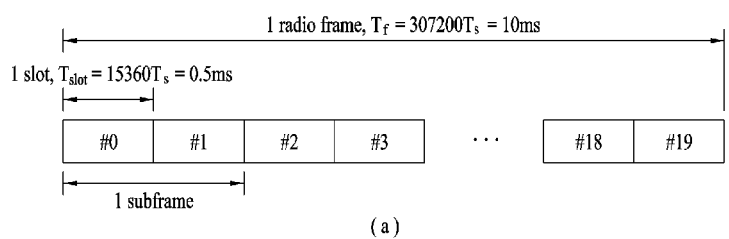
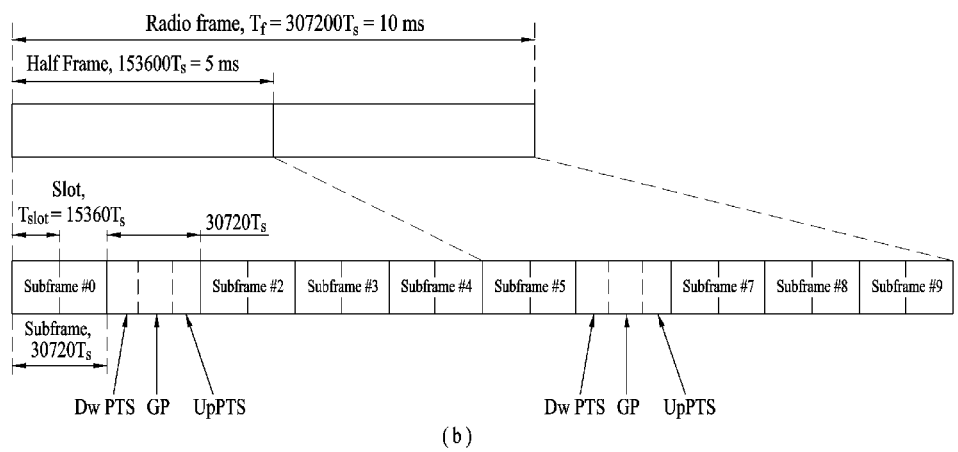

PUCCH format 1a/1b structure (normal CP)

PUCCH format 1a/1b structure (extended CP)

PUCCH format 2/2a/2b structure (normal CP)

PUCCH format 2/2a/2b structure (extended CP)

METHOD FOR TRANSMITTING AND RECEIVING SIGNAL BASED ON SHARED RESOURCE IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2016/ 003574, filed on Apr. 6, 2016, which claims the benefit of U.S. Provisional Application No. 62/143,788, filed on Apr. 6, 2015, 62/158,541, filed on May 8, 2015, 62/196,310, filed on Jul. 24, 2015, 62/245,293, filed on Oct. 23, 2015, and 62/272,066, filed on Dec. 28, 2015, the contents of which are all hereby incorporated by reference herein in their entirety.

TECHNICAL FIELD

The present invention relates to a wireless communication system, and more particularly, to a method of transmitting and receiving a signal based on a shared resource and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

One object of the present invention is to provide a method of efficiently transmitting and receiving an uplink/downlink signal and an apparatus therefor.

Specifically, another object of the present invention is to provide a method of efficiently transmitting and receiving a signal in consideration of a relation between a user equipment (UE) and a different UE and an apparatus therefor.

More specifically, the other object of the present invention is to provide a method of efficiently selecting a reference signal sequence for transmitting and receiving a signal based on a shared resource in the aspect of a UE, a method of efficiently controlling transmit power, a method of efficiently preventing a collision, and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of transmitting a signal, which is transmitted by a user equipment (UE) based on a shared resource capable of being shared with a different UE in a wireless communication system, includes the steps of receiving configuration information on the shared resource from an eNB, generating a reference signal for transmitting uplink data, and transmitting the reference signal for transmitting the uplink data of the shared resource by mapping the reference signal to a resource unit.

The configuration information receiving step can further include the step of receiving information on the reference signal sequence set.

To further achieve these and other advantages and in accordance with the purpose of the present invention, according to a different embodiment, a method of receiving a signal, which is received by an eNB based on a shared resource in a wireless communication system, includes the steps of transmitting configuration information on the shared resource to a user equipment (UE), and receiving a reference signal and data transmitted in a specific resource unit of the shared resource from the UE. In this case, the reference signal can be generated based on a specific sequence belonging to a reference signal sequence set designated for the shared resource.

To further achieve these and other advantages and in accordance with the purpose of the present invention, according to a further different embodiment, a user equipment transmitting a signal based on a shared resource capable of being shared with a different user equipment in a wireless communication system includes a transceiver configured to transmit or receive a signal and a processor configured to control the transceiver, the processor configured to control the transceiver to receive configuration information on the shared resource from an eNB, the processor configured to generate a reference signal for transmitting uplink data, the processor configured to control the transceiver to transmit the reference signal for transmitting the uplink data of the shared resource to the eNB by mapping the reference signal to a resource unit. In this case, the reference signal can be generated based on a specific sequence belonging to a reference signal sequence set designated for the shared resource.

To further achieve these and other advantages and in accordance with the purpose of the present invention, according to a further different embodiment, an eNB receiving a signal based on a shared resource in a wireless communication system includes a transceiver configured to transmit or receive a signal and a processor configured to control the transceiver, the processor configured to control the transceiver to transmit configuration information on the shared resource to a user equipment, the processor configured to control the transceiver to receive a reference signal and data transmitted in a specific resource unit of the shared resource from the user equipment. In this case, the reference signal can be generated based on a specific sequence belonging to a reference signal sequence set designated for the shared resource.

Following items can be commonly applied to the aforementioned embodiments.

The specific sequence can be randomly selected from the reference signal sequence set.

The method performed by the user equipment can further include the steps of receiving a reference signal for measuring a channel from the eNB and performing channel measurement based on the reference signal.

In this case, the specific sequence can be determined based on a result of the channel measurement.

In this case, the result of the channel measurement can be represented by at least one selected from the group consisting of AOA (angle of arrival), a precoding matrix indicator (PMI), and reception power.

Or, a parameter for generating the specific sequence may change with a prescribed pattern over time.

A parameter for generating the specific sequence can be determined by adding a prescribed offset to an initial value over time.

A parameter for generating the specific sequence can be determined based on a pseudo random function.

The method performed by the user equipment can further include the step of scrambling the reference signal and the data using a specific scrambling sequence. In this case, the specific scrambling sequence is interlocked with a specific sequence for the reference signal.

More specifically, the specific scrambling sequence can be generated based on a value resulted from adding a prescribed offset to an initial value of a scrambling sequence. In this case, the prescribed offset can be determined by a parameter for generating the specific sequence.

Meanwhile, if there is no data to be transmitted in the shared resource, transmission may not be performed in the resource unit.

The reference signal sequence set can be configured by at least one selected from the group consisting of a set of virtual cell IDs, a set of cyclic shift parameters, and a set of orthogonal sequence covers.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, it is able to efficiently transmit and receive an uplink/downlink signal.

Specifically, according to the present invention, it is able to provide a method of efficiently transmitting and receiving a signal in consideration of a relation between a user equipment (UE) and a different UE and an apparatus therefor.

More specifically, according to the present invention, it is able to provide a method of efficiently selecting a reference signal sequence for transmitting and receiving a signal based on a shared resource in the aspect of a UE, a method of efficiently controlling transmit power, a method of efficiently preventing a collision, and an apparatus therefor.

Moreover, according to the present invention, when a plurality of user equipments transmit an uplink signal through a shared resource, it is able to prevent a collision among radio resources.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 1 is a diagram for an example of a radio frame structure used in a wireless communication system;

BEST MODE

Mode for Invention

Figure 2:
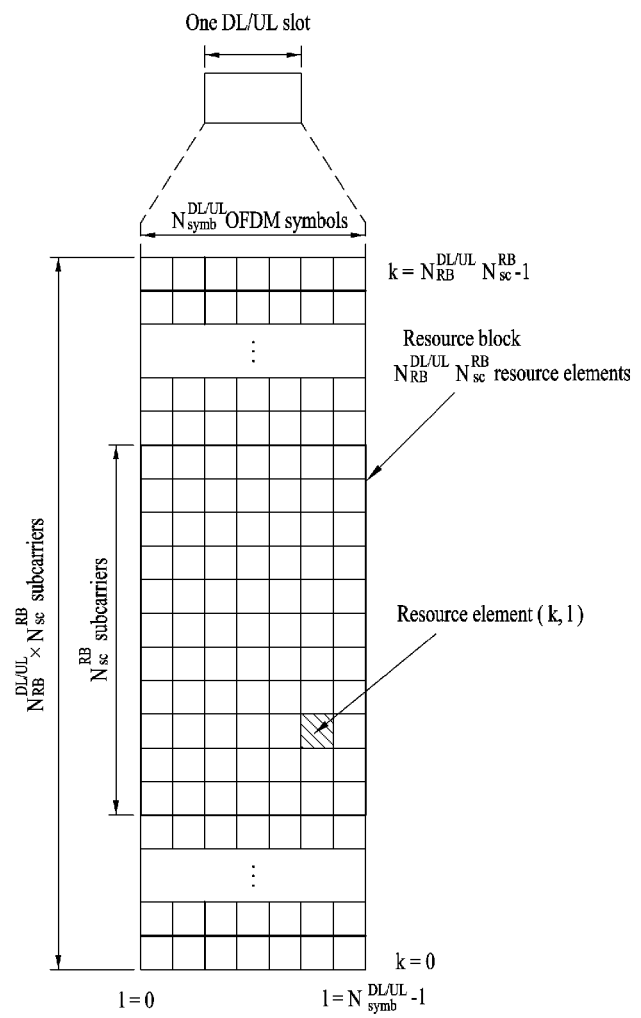
FIG. 2 is a diagram for an example of a downlink (DL)/uplink (UL) slot structure in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different sub-frame configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  | 4384 · $T_s$ | 5120 · $T_s$ |
| 5 | 6592 · $T_s$  | 4384 · $T_s$ | 5120 · $T_s$ | 20480 · $T_s$ |              |              |
| 6 | 19760 · $T_s$ |              |              | 23040 · $T_s$ |              |              |
| 7 | 21952 · $T_s$ |              |              | —             | —            | —            |
| 8 | 24144 · $T_s$ |              |              | —             | —            | —            |

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

In one subframe, two RBs each located in two slots of the subframe while occupying the same $N_{sc}^{RB}$ consecutive subcarriers are referred to as a physical resource block (PRB) pair. Two RBs configuring a PRB pair have the same PRB number (or the same PRB index).

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

More specifically, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting the SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The DL carrier frequency and the corresponding system bandwidth may be acquired by the PBCH, and the UL carrier frequency and the corresponding system bandwidth may be acquired through system information, which is a DL signal. For example, the UE may acquire a SystemInformationBlockType2 (SIB2) and determine the entire UL system band that the UE is allowed to use for UL transmission, through the UL-carrier frequency and UL-bandwidth information in the SIB2.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDDCH/PDSCH reception and PUSCH/PUCCH transmission as general uplink/downlink transmission procedures.

The random access procedure is also called RACH (random access channel) procedure. The random access procedure is used for initial access, uplink synchronization adjustment, resource assignment, handover, etc. The random access procedure is classified into a contention-based process and a dedicated (i.e. non-contention-based) process. The contention-based random access procedure includes initial access and is normally used, whereas the dedicated random access procedure is limitedly used for handover. In the contention-based random access procedure, a UE randomly select a RACH preamble sequence. Accordingly, a plurality of UEs can simultaneously transmit the same RACH preamble sequence and thus a contention resolution procedure is not needed. In the dedicated random access procedure, a UE uses a RACH preamble sequence uniquely allocated thereto by an eNB. Accordingly, the UE can perform the random access procedure without colliding with other UEs.

The contention-based random access procedure has the following four steps. Hereinafter, messages transmitted in steps 1 to 4 may be respectively referred to as Msg 1 to Msg 4.

Step 1: RACH preamble (via PRACH) (UE to eNB)
Step 2: Random access response (RAR) (via PDCCH and PDSCH) (eNB to UE)
Step 3: Layer 2/Layer 3 message (via PUSCH) (UE to eNB)
Step 4: Contention resolution message (eNB to UE)

The dedicated random access procedure includes the following three steps. Hereinafter, uplink transmission (i.e. step 3) corresponding to a RAR may be performed as a part of the random access procedure. The dedicated random access procedure can be triggered using a PDCCH (hereinafter, referred to as PDCCH order) used for an eNB to command RACH preamble transmission.

Step 0: PACH preamble allocation through dedicated signaling (eNB to UE)
Step 1: RACH preamble (via PRACH) (UE to eNB)
Step 2: RAR (via PDCCH and PDSCH) (eNB to UE)

After transmission of RACH preamble, the UE attempts to receive a random access response (RAR) within a predetermined time window. Specifically, the UE attempts to detect a PDCCH (hereinafter, referred to as RA-RNTI PDCCH) having an RA-RNTI (Random Access RNTI) (e.g., CRC is masked with RA-RNTI in the PDCCH) within the time window. The UE checks whether a RAR therefor is present in a PDSCH corresponding to the RA-RNTI PDCCH during RA-RNTI PDCCH detection. The RAR includes timing advance (TA) information indicating timing offset information for UL synchronization, UL resource allocation information (UL grant information), a temporary UE identifier (e.g., temporary cell-RNTI, TC-RNTI), etc. The UE can perform UL transmission (e.g., Msg3) in accordance with resource allocation information and TA value in the RAR. HARQ is applied to UL transmission corresponding to the RAR. Accordingly, the UE can receive acknowledgement information (e.g., PHICH) corresponding to Msg 3 after transmission of Msg 3.

Figure 3:
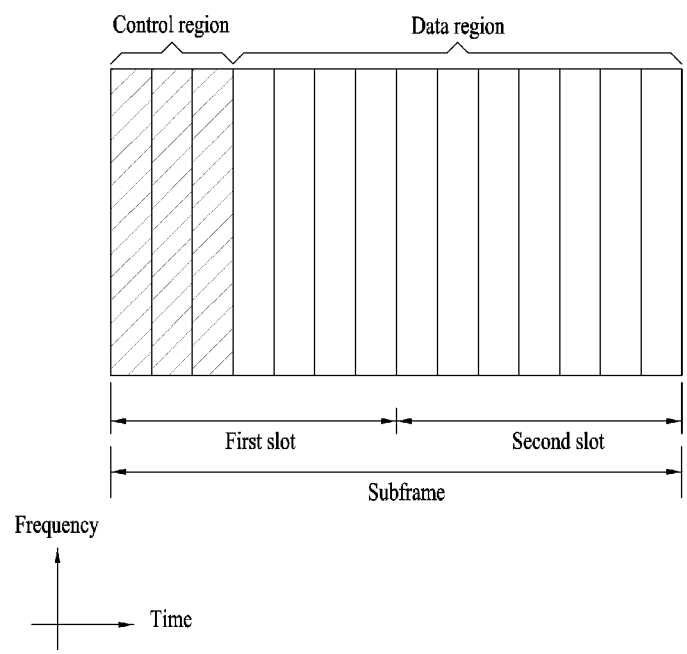
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
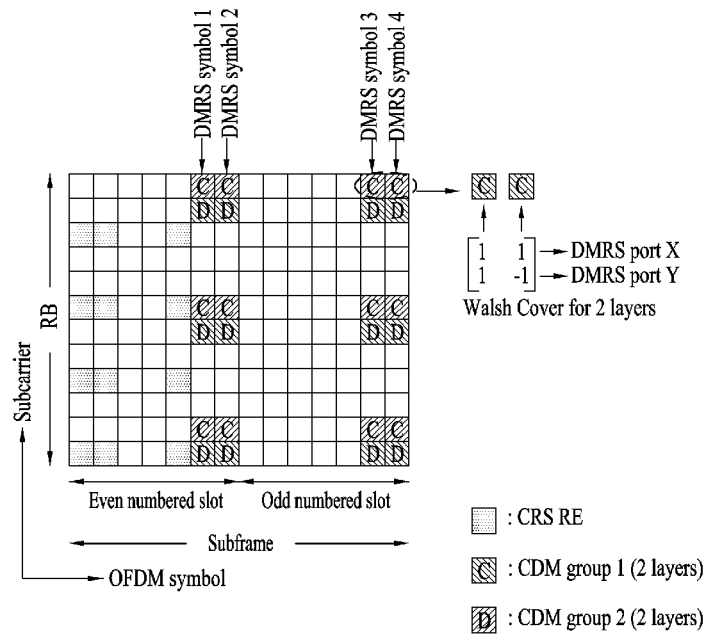
FIGS. 4 and 5 illustrate time-frequency resources for cell-specific reference signals (CRSs) and demodulation reference signals (DM RSs) in an RB pair of a normal subframe having a normal cyclic prefix (CP)
Figure 5:
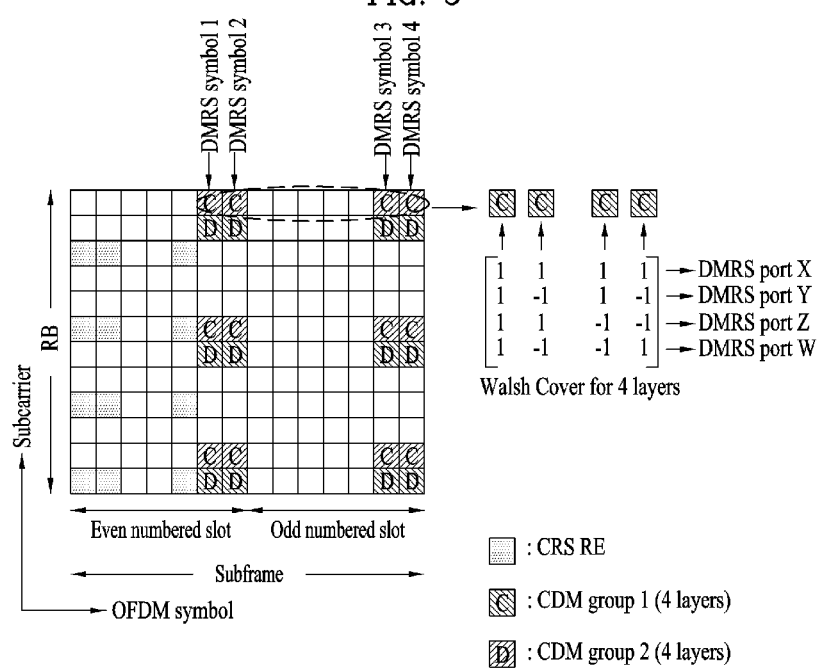

FIGS. 4 and 5 illustrate time-frequency resources for CRSs and DM RSs in an RB pair of a normal subframe having a normal CP. Specifically, FIG. 4 illustrates a method for multiplexing a maximum of 4 DM RSs with two CDM groups and FIG. 5 illustrates a method for multiplexing a maximum of 8 DM RSs with two CDM groups.

Referring to FIGS. 4 and 5, DM RSs are defined in a PRB pair in a 3GPP LTE(-A) system. Hereinbelow, among REs of one PRB pair, a set of REs in which distinguishable DM RSs extended by orthogonal cover codes are transmitted is referred to as a code division multiplexing (CDM) group. The orthogonal cover code may be, for example, a Walsh-Hadmard code. The orthogonal cover code may also be called an orthogonal sequence. Referring to FIGS. 4 and 5, REs denoted by 'C' belong to one CDM group (hereinafter, CDM group 1) and REs denoted by 'D' belong to another CDM group (hereinafter, a CDM group 2).

In a 3GPP LTE(-A) system, a plurality of layers may be multiplexed in one subframe and then is transmitted to a receiving device. In the present invention, a layer transmitted by a transmitting device indicates an information input path to a precoder. The layer may be referred to as a transmission layer, a stream, a transmission stream, or a data stream. Transmission data is mapped to one or more layers. Therefore, data is transmitted from the transmitting device to the receiving device by one or more layers. In case of multi-layer transmission, the transmitting device transmits DM RS per layer, and the number of DM RSs increases in proportion to the number of transmission layers.

One antenna port may transmit one layer and one DM RS. When the transmitting device needs to transmit 8 layers, a maximum of four antenna ports may transmit four DM RSs using one CDM group. For example, referring to FIG. 5, DM RS port X, DM RS port Y, DM RS port Z, and DM RS port W may transmit four DM RSs spread by different orthogonal sequences, respectively, using the same CDM group. The receiving device may detect the DM RSs from signals received on four consecutive DM RS REs in an OFDM direction, using orthogonal sequences used to multiplex the DM RSs on the four DM RS REs.

A DM RS is generated from a seed value based on a physical layer cell ID $N^{cell}_{ID}$. For example, for any of antenna ports $p \in \{7, 8, \ldots, \gamma+6\}$, the DM RS may be defined by $$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N^{max,DL}_{RB} - 1 & normal\ cyclic\ prefix \\ 0, 1, \ldots, 16N^{max,DL}_{RB} - 1 & extended\ cyclic\ prefix \end{cases}$$ [Equation 1]

In Equation 1, $N^{max,DL}_{RB}$ is the largest DL bandwidth configuration, expressed in multiples of $N^{RB}_{sc}$. The pseudo-random sequence c(i) may be defined by a length-31 Gold sequence. The output sequence c(n) of length $M_{PN}$, where n=0, 1, . . . , $M_{PN-1}$, is defined by the following equation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$ [Equation 2]

In Equation 2, $N_C = 1600$ and the first m-sequence is initialized with $x_1(0)=1$, $x_1(n)=0$, n=1, 2, . . . , 30. The initialization of the second m-sequence is denoted by the following equation with a value depending on the application of the sequence.

$$c_{init} = \sum_{i=0}^{30} x_2(i) \cdot 2^i$$ [Equation 3]

For Equation 1, the pseudo-random sequence generator is initialized with the following equation at the start of each subframe.

$$c_{init} = (\lfloor n_s/2 \rfloor + 1) \cdot (2N^{cell}_{ID} + 1) \cdot 2^{16} + n_{SCID}$$ [Equation 4]

In Equation 4, the value of $n_{SCID}$ is zero unless specified otherwise. For a PDSCH transmission on ports 7 or 8, $n_{SCID}$ is given by the DCI format 2B or 2C associated with the PDSCH transmission. DCI format 2B is a DCI format for resource assignment for a PDSCH using up to two antenna ports with DM RSs and DCI format 2C is a DCI format for resource assignment for a PDSCH using up to 8 antenna ports with DM RSs. In the case of DCI format 2B, $n_{SCID}$ is indicated by the scrambling identity field according to Table 3. In the case of DCI format 2C, $n_{SCID}$ is given by Table 4.

TABLE 3

| Scrambling identity field in DCI format 2B | $n_{SCID}$ |
|---|---|
| 0 | 0 |
| 1 | 1 |

TABLE 4

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Figure 6:
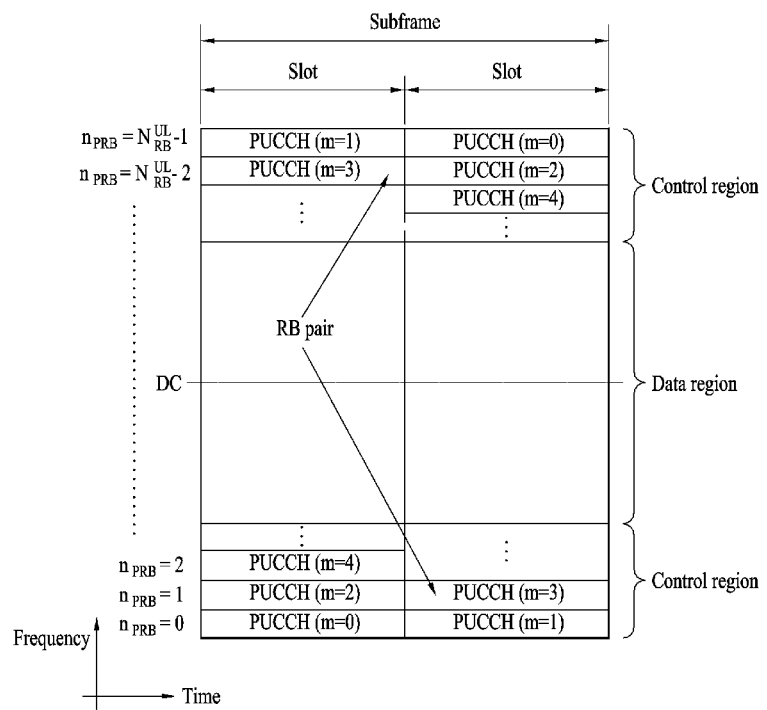
FIG. 6 is a diagram showing the structure of an uplink subframe.

FIG. 6 illustrates an exemplary uplink subframe structure used in 3GPP LTE/LTE-A.

Referring to FIG. 6, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.
  HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.
  Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 5 shows the mapping relationship between PUCCH formats and UCI in LTE/LTE-A.

TABLE 5

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 5, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

FIGS. 7 to 11 illustrate UCI transmission using PUCCH format 1 series, PUCCH format 2 series, and PUCCH format 3 series.

In a 3GPP LTE/LTE-A system, a DL/UL subframe having a normal CP consists of two slots each including 7 OFDM symbols and a DL/UL subframe having an extended CP consists of two slots each having 6 OFDM symbols. Since the number of OFDM symbols in each subframe varies with CP length, a structure in which a PUCCH is transmitted in a UL subframe also varies with CP length. Accordingly, a UCI transmission method of a UE in the UL subframe depends on a PUCCH format and CP length.

Figure 7:
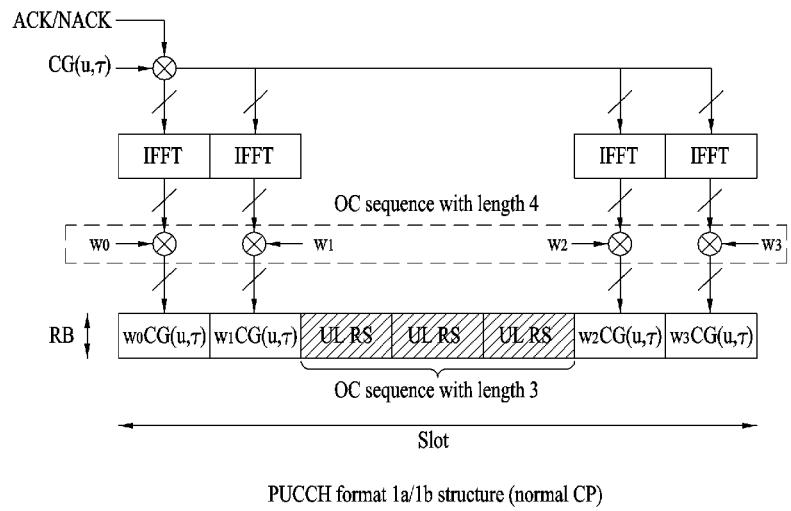
FIGS. 7 to 11 illustrate UCI transmission using physical uplink control channel (PUCCH) format 1 series, PUCCH format 2 series, and PUCCH format 3 series.
Figure 8:
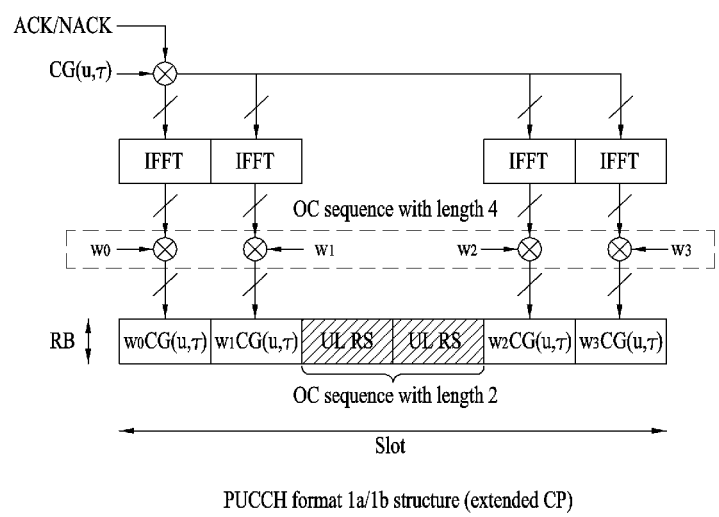

Referring to FIGS. 7 and 8, control information transmitted using PUCCH formats 1a and 1b is repeated with the same contents on a slot basis in a subframe. Each UE transmits an ACK/NACK signal on different resources including different cyclic shifts (frequency domain codes) of a computer-generated constant amplitude zero autocorrelation (CG-CAZAC) sequence and orthogonal covers (OCs) or orthogonal cover codes (OCCs) (time domain spreading codes). An OCC is referred to as an orthogonal sequence. An OC includes, for example, a Walsh/discrete Fourier transform (DFT) OC. Provided that the number of cyclic shifts is 6 and the number of OCs is 3, a total of 18 PUCCHs may be multiplexed in the same physical resource block (PRB) based on a single antenna port. Orthogonal sequences $w_0$, $w_1$, $w_2$ and $w_3$ may be applied in either an arbitrary time domain (after fast Fourier transform (FFT) modulation) or an arbitrary frequency domain (before FFT modulation). In the 3GPP LTE/LTE-A system, PUCCH resources for ACK/NACK transmission are expressed as a combination of a position of a time-frequency resource (e.g. PRB), a cyclic shift of a sequence for frequency spreading, and a (quasi) OC for time spreading and each PUCCH resource is indicated using a PUCCH resource index (also referred to as a PUCCH index). PUCCH format 1 series for scheduling request (SR) transmission is the same in a slot level structure as PUCCH format 1a and 1b and differs only in a modulation method from the PUCCH formats 1a and 1b.

Figure 9:
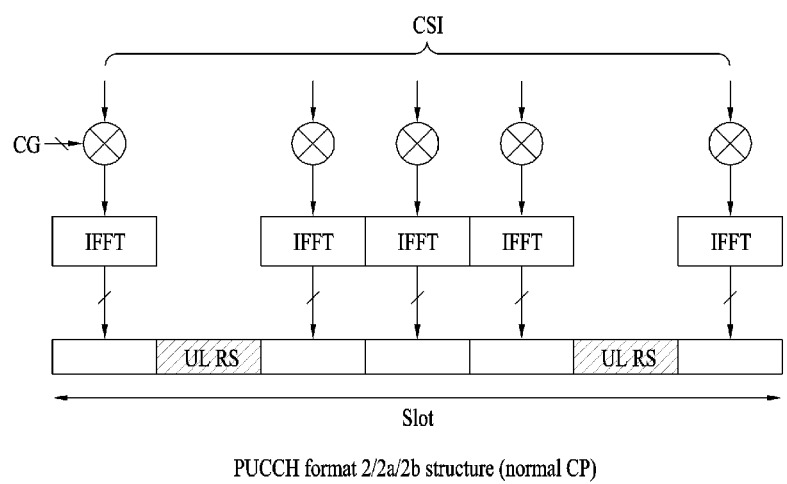
Figure 10:
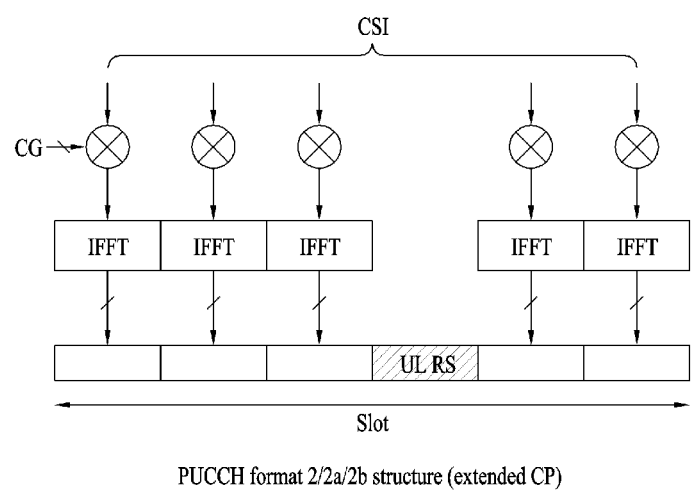

FIG. 9 illustrates an example of transmitting channel state information (CSI) using PUCCH formats 2/2a/2b in a UL slot having a normal CP and FIG. 10 illustrates an example of transmitting CSI using PUCCH formats 2/2a/2b in a UL slot having an extended CP.

Referring to FIGS. 9 and 10, in a normal CP, one UL subframe includes 10 OFDM symbols except for a symbol carrying a UL RS. CSI is coded into 10 transport symbols (also referred to as complex-valued modulation symbols) through block coding. The 10 transport symbols are mapped to the 10 OFDM symbols, respectively, and then are transmitted to an eNB.

PUCCH format 1/1a/1b and PUCCH format 2/2a/2b may carry only up to a predetermined number of bits. However, as carrier aggregation and the number of antennas have increased and a TDD system, a relay system, and a multi-node system have been introduced, the amount of UCI has increased and thus a PUCCH format capable of carrying more UCI than PUCCH format 1/1a/1b/2/2a/2b has been introduced. This format is referred to as PUCCH format 3. For instance, PUCCH format 3 may be used when a UE for which carrier aggregation is configured transmits, through a specific UL carrier, a plurality of ACK/NACK signals for a plurality of PDSCHs received from the eNB through a plurality of DL carriers.

Figure 11:
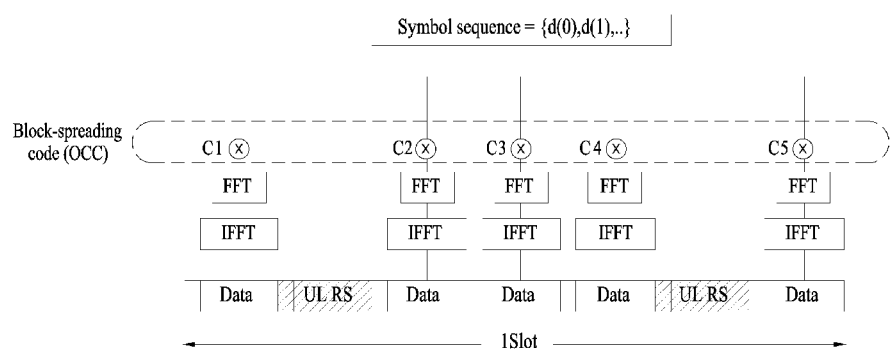

PUCCH format 3 may be configured based on, for example, block-spreading. Referring to FIG. 11, block-spreading is a scheme for spreading a symbol sequence by an OCC (also called an orthogonal sequence) on the time domain and transmitting the spread symbol sequence. According to the block-spreading scheme, control signals of multiple UEs may be multiplexed on the same RB by the OCC and transmitted to an eNB. In PUCCH format 2, one symbol sequence is transmitted over the time domain, and UCI of the UEs is multiplexed using a cyclic shift of a CAZAC sequence and transmitted to the eNB. On the other hand, in a new PUCCH format based on block spreading (hereinafter, PUCCH format 3), one symbol sequence is transmitted over the frequency domain, and the UCI of the UEs is multiplexed using OCC based time-domain spreading and transmitted to the eNB. For example, referring to FIG. 9, one symbol sequence is spread by a length-5 (i.e. spreading factor (SF)=5) OCC and mapped to five SC-FDMA symbols. While a total of two RS symbols is used in one slot in FIG. 11, three RS symbols may be used and an OCC of SF=4 may be used to spread a symbol sequence and multiplex signals of UEs. The RS symbols may be generated by a CAZAC sequence having a specific cyclic shift and may be transmitted to the eNB from the UE in a manner of applying (multiplying) a specific OCC to/by a plurality of RS symbols in the time domain. In FIG. 11, DFT may be applied prior to the OCC and FFT may be applied instead of DFT.

In FIGS. 7 to 11, UL RSs transmitted along with UCI on a PUCCH may be used to demodulate the UCI at the eNB.

Figure 12:
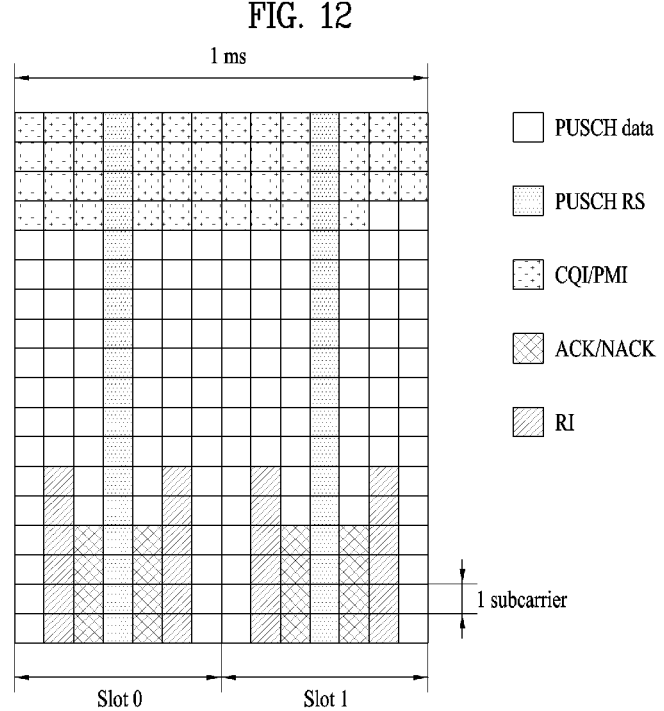
FIG. 12 illustrates multiplexing of UCI and UL data in a physical uplink shared channel (PUSCH) region.

FIG. 12 illustrates multiplexing of UCI and UL data in a PUSCH region.

UL data may be transmitted through a PUSCH in a data region of a UL subframe. A DM RS, which is an RS signal used to demodulate the UL data, may be transmitted together with the UL data in a data region of the UL subframe. Hereinafter, a control region and a data region in the UL subframe will be referred to as a PUCCH region and a PUSCH region, respectively.

If UCI needs to be transmitted in a subframe to which PUSCH transmission is allocated, the UE multiplexes the UCI and UL data (hereinafter, PUSCH data) prior to DFT-spreading and transmits the multiplexed UL signal on a PUSCH, unless simultaneous transmission of a PUSCH and PUCCH is permitted. The UCI includes at least one of CQI/PMI, HARQ ACK/NACK, and RI. The number of REs used for CQI/PMI, ACK/NACK, and RI transmission is based on a modulation and coding scheme (MCS) allocated for PUSCH transmission and on offset values $\Delta^{CQI}_{offset}$, $\Delta^{HARQ-ACK}_{offset}$, and $\Delta^{RI}_{offset}$. The offset values permit different coding rates according to UCI and are semi-statically configured by higher-layer (e.g. radio resource control (RRC) signaling. The PUSCH data and UCI are not be mapped to the same RE. The UCI is mapped to both slots of a subframe.

Referring to FIG. 12, CQI and/or PMI (CQI/PMI) resources are located at the start part of PUSCH data resources. The CQI/PMI resources are sequentially mapped to all SC-FDMA symbols on one subcarrier and then are mapped on the next subcarrier. The CQI/PMI resources are mapped starting from left to right, that is, in the direction of ascending SC-FDMA symbol index, within a subcarrier. The PUSCH data is rate-matched in consideration of the amount of the CQI/PMI resources (i.e. the number of coded symbols). A modulation order which is the same as the modulation order of UL-SCH data is used for CQI/PMI. ACK/NACK is inserted through puncturing part of SC-FDMA resources to which UL-SCH data is mapped. ACK/NACK is located besides a PUSCH RS which is an RS used to demodulate the PUSCH data and is filled starting bottom to top, that is, in the direction of ascending subcarrier index, within an SC-FDMA symbol. In the case of a normal CP, SC-FDMA symbols for ACK/NACK are located at SC-FDMA symbols #2/#5 in each slot as illustrated in FIG. 12. Irrespective of whether ACK/NACK is actually transmitted in a subframe, a coded RI is located next to the symbol for ACK/NACK.

In 3GPP LTE, UCI may be scheduled to be transmitted on a PUSCH without PUSCH data. ACK/NACK, RI, and CQI/PMI may be multiplexed in a similar way to multiplexing as illustrated in FIG. 12. Channel coding and rate matching for control signaling without the PUSCH data are identical to channel coding and rate matching for control signaling with the PUSCH data.

In FIG. 12, the PUSCH RS may be used to demodulate the UCI and/or the PUSCH data transmitted in a PUSCH region. In the present invention, a UL RS associated with PUCCH transmission and a PUSCH RS associated with PUSCH transmission are referred to as a DM RS.

Meanwhile, although not shown in FIG. 12, a sounding reference signal (SRS) may be allocated to a PUSCH region. The SRS is a UL RS not associated with PUSCH or PUCCH transmission. The SRS is transmitted on an OFDM symbol which is located at the last part of a UL subframe in the time domain and on a data transmission band of the UL subframe, that is, on the PUSCH region, in the frequency domain. The eNB may measure a UL channel state between the UE and the eNB using the SRS. SRSs of multiple UEs transmitted/received on the last OFDM symbol of the same subframe may be distinguished according to a frequency location/sequence.

Since the UL RS, the PUSCH RS, and the SRS are UE-specifically generated by a specific UE and are transmitted to the eNB, theses signals may be called UL UE-specific RSs.

An RS sequence $r^{(\alpha)}_{u,v}(n)$ is defined by a cyclic shift α of a base sequence $r_{u,v}(n)$.

$$R_{u,v}^{(\alpha)}(n) = e^{j\alpha n} \cdot r_{u,v}(n), \quad 0 \leq n < M_{sc}^{RS} \qquad \text{[Equation 5]}$$

In Equation 5, $M^{RS}_{sc} = m \cdot N^{RB}_{sc}$ is the length of the reference signal sequence and $1 \leq m \leq N^{max,UL}_{RB}$. $N^{max,UL}_{RB}$ is the largest UL bandwidth configuration, expressed in multiples of $N^{RB}_{sc}$.

Base sequences $r_{u,v}(n)$ are divided into groups.). In $r_{u,v}(n)$, $u \in \{0, 1, \ldots, 29\}$ is the group number (i.e. group index), v is the base sequence number within the group (i.e. base sequence index). Each base sequence group may contain one base sequence (v=0) of each length $M^{RS}_{sc} = m \cdot N^{RB}_{sc}$ ($1 \leq m \leq 5$) and two base sequences of each length $M^{RS}_{sc} = m \cdot N^{RB}_{sc}$ ($6 \leq m \leq N^{max,UL}_{RB}$). The sequence group number u and the number v within the group may vary in time.

A base sequence having a length of longer than $3N_{sc}^{RB}$ can be defined as follows. For $M_{sc}^{RS} \geq 3N_{sc}^{RB}$, base sequence $\bar{r}_{u,v}(0), \ldots, \bar{r}_{u,v}(M_{sc}^{RS}-1)$ is given by the following Equation 6.

$$\bar{r}_{u,v}(n) = x_q(n \bmod N_{ZC}^{RS}), \quad 0 \leq n < M_{sc}^{RS} \qquad \text{[Equation 6]}$$

Here, the q-th root Zadoff-Chu sequence can be defined by the following Equation 7.

$$x_q(m) = e^{-j\frac{\pi q m(m+1)}{N_{ZC}^{RS}}}, \quad 0 \leq m \leq N_{ZC}^{RS} - 1 \qquad \text{[Equation 7]}$$

Here, q satisfies the following Equation 8.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \qquad \text{[Equation 8]}$$

The length $N_{ZC}^{RS}$ of the Zadoff-Chue sequence is given by the largest prime number, and thus $N_{ZC}^{RS} < M_{sc}^{RS}$ is satisfied.

A base sequence having a length of less than $3N_{sc}^{RB}$ can be defined as follows. The base sequence is given by the following Equation 9 for $M_{sc}^{RS} = N_{sc}^{RB}$ and $M_{sc}^{RS} = 2N_{sc}^{RB}$.

$$\bar{r}_{u,v}(n) = e^{j\varphi(n)\pi/4}, \quad 0 \leq n \leq M_{sc}^{RS}-1 \qquad \text{[Equation 9]}$$

Here, for $M_{sc}^{RS} = N_{sc}^{RB}$ and $M_{sc}^{RS} = 2N_{sc}^{RB}$, φ(n) is given as shown in Tables 6 and 7, respectively.

TABLE 6

| u | φ(0), . . . , φ(11) | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |

TABLE 6-continued

| u | φ(0), . . . , φ(11) | | | | | | | | | | | |
|---|---|---|---|---|---|---|---|---|---|---|---|---|
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | −3 | 1 | |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | 1 | −1 | −3 | |
| 22 | 1 | 1 | −3 | −3 | −3 | −1 | 3 | −3 | 1 | −3 | 3 | |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

The group-hopping pattern $f_{gh}(n_s)$ may be given for PUSCH and PUCCH by the following equation.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$ [Equation 11]

In Equation 11, the pseudo-random sequence c(i) is defined by Equation 2. The pseudo-random sequence generator is initialized with $c_{init}$ according to the following equation at the beginning of each radio frame.

$$c_{init} = \left\lfloor \frac{N_{ID}^{cell}}{30} \right\rfloor$$ [Equation 12]

According to the current 3GPP LTE(-A) standards, the group-hopping pattern is the same for PUSCH and PUCCH

TABLE 7

| u | φ(0), . . . , φ(23) | | | | | | | | | | | | | | | | | | | | | | | |
|---|---|---|---|---|---|---|---|---|---|---|---|---|---|---|---|---|---|---|---|---|---|---|---|---|
| 0 | −1 | 3 | 1 | −3 | 3 | −1 | 1 | 3 | −3 | 3 | 1 | 3 | −3 | 3 | 1 | 1 | −1 | 1 | 3 | −3 | 3 | −3 | −1 | −3 |
| 1 | −3 | 3 | −3 | −3 | −3 | 1 | −3 | −3 | 3 | −1 | 1 | 1 | 1 | 3 | 1 | −1 | 3 | −3 | −3 | 1 | 3 | 1 | 1 | −3 |
| 2 | 3 | −1 | 3 | 3 | 1 | 1 | −3 | 3 | 3 | 3 | 3 | 1 | −1 | 3 | −1 | 1 | 1 | −1 | −3 | −1 | −1 | 1 | 3 | 3 |
| 3 | −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| 4 | −1 | −1 | −1 | −3 | −3 | −1 | 1 | 1 | 3 | 3 | −1 | 3 | −1 | 1 | −3 | 1 | −1 | −3 | −3 | 1 | −3 | −1 | −1 | |
| 5 | −3 | 1 | 1 | 3 | −1 | 1 | 3 | 1 | −3 | 1 | −3 | 1 | 1 | −1 | −1 | 3 | −1 | −3 | 3 | −3 | −3 | −3 | 1 | 1 |
| 6 | 1 | 1 | −1 | −1 | 3 | −3 | −3 | 3 | −3 | 1 | −1 | −1 | 1 | −1 | 1 | 1 | −1 | −3 | −1 | 1 | −1 | 3 | −1 | −3 |
| 7 | −3 | 3 | 3 | −1 | −1 | −3 | −1 | 3 | 1 | 3 | 1 | 3 | 1 | 1 | −1 | 3 | 1 | −1 | 1 | 3 | −3 | −1 | −1 | 1 |
| 8 | −3 | 1 | 3 | −3 | 1 | −1 | −3 | 3 | −3 | 3 | −1 | −1 | −1 | −1 | 1 | −3 | −3 | −3 | 1 | −3 | −3 | −3 | 1 | −3 |
| 9 | 1 | 1 | −3 | 3 | 3 | −1 | −3 | −1 | 3 | −3 | 3 | 3 | 3 | −1 | 1 | 1 | −3 | 1 | −1 | 1 | 1 | −3 | 1 | 1 |
| 10 | −1 | 1 | −3 | −3 | 3 | −1 | 3 | −1 | −1 | −3 | −3 | −3 | −1 | −3 | −3 | 1 | −1 | 1 | 3 | 3 | −1 | 1 | −1 | 3 |
| 11 | 1 | 3 | −3 | −3 | 1 | 3 | 1 | −3 | −3 | −3 | −3 | 3 | 3 | −3 | 3 | 3 | −1 | −3 | 3 | −1 | 1 | −3 | 1 | |
| 12 | 1 | 3 | 3 | 1 | 1 | 1 | −1 | −1 | 1 | −3 | 3 | −1 | 1 | 1 | −3 | 3 | 3 | −1 | −3 | 3 | −3 | −1 | −3 | −1 |
| 13 | 3 | −1 | −1 | −1 | −1 | −3 | −1 | 3 | 3 | 1 | −1 | 1 | 3 | 3 | 3 | −1 | 1 | 1 | −3 | 1 | 3 | −1 | −3 | 3 |
| 14 | −3 | −3 | 3 | 1 | 3 | 1 | −3 | 3 | 1 | 3 | 1 | 1 | 3 | 3 | −1 | −1 | −3 | 1 | −3 | −1 | 3 | 1 | 1 | 3 |
| 15 | −1 | −1 | 1 | −3 | 1 | 3 | −3 | 1 | −1 | −3 | −1 | 3 | 1 | 3 | 1 | −1 | −3 | −3 | −1 | −1 | −3 | −3 | −3 | −1 |
| 16 | −1 | −3 | 3 | −1 | −1 | −1 | −1 | 1 | 1 | −3 | 3 | 1 | 3 | 3 | 1 | −1 | 1 | −3 | 1 | −3 | 1 | 1 | −3 | −1 |
| 17 | 1 | 3 | −1 | 3 | 3 | −1 | −3 | 1 | −1 | −3 | 3 | 3 | 3 | −1 | 1 | 1 | 3 | −1 | −3 | −1 | 3 | −1 | −1 | −1 |
| 18 | 1 | 1 | 1 | 1 | 1 | −1 | 3 | −1 | −3 | 1 | 1 | 3 | −3 | 1 | −3 | −1 | 1 | 1 | −3 | −3 | 3 | 1 | 1 | −3 |
| 19 | 1 | 3 | 3 | 1 | −1 | −3 | 3 | −1 | 3 | 3 | 3 | −3 | 1 | −1 | 1 | −1 | −3 | −1 | 1 | 3 | −1 | 3 | −3 | −3 |
| 20 | −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| 21 | −3 | −3 | 1 | 1 | −1 | 1 | −1 | 1 | −1 | 3 | 1 | −3 | −1 | 1 | −1 | 1 | −1 | −1 | 3 | 3 | −3 | −1 | 1 | −3 |
| 22 | −3 | −1 | −3 | 3 | 1 | −1 | −3 | −3 | −3 | 3 | −3 | 3 | −3 | −1 | 1 | 3 | 1 | −3 | 1 | 3 | 3 | −1 | −3 | −3 |
| 23 | −1 | −1 | −1 | −1 | 3 | 3 | 3 | 1 | 3 | 3 | −3 | 1 | 3 | −1 | 3 | −1 | 3 | 3 | −3 | 3 | 1 | −1 | 3 | 3 |
| 24 | 1 | −1 | 3 | 3 | −1 | −3 | 3 | −3 | −1 | −1 | 3 | −1 | 3 | −1 | −1 | 1 | 1 | 1 | 1 | −1 | −1 | −3 | −1 | 3 |
| 25 | 1 | −1 | 1 | −1 | 3 | −1 | 3 | 1 | 1 | −1 | −1 | −3 | 1 | 1 | −3 | 1 | 3 | −3 | 1 | 1 | −3 | −3 | −1 | −1 |
| 26 | −3 | −1 | 1 | 3 | 1 | 1 | −3 | −1 | −1 | −3 | 3 | −3 | 3 | 1 | −3 | 3 | −3 | 1 | −1 | 1 | −3 | 1 | 1 | 1 |
| 27 | −1 | −3 | 3 | 3 | 1 | 1 | 3 | −1 | −3 | −1 | −1 | −1 | 3 | 1 | −3 | −3 | −1 | 3 | −3 | −1 | −3 | −1 | −3 | −1 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

Meanwhile, RS hopping will now be described.

The sequence-group number u in slot $n_s$ is defined by a group hopping pattern $f_{gh}(n_s)$ and a sequence-shift pattern $f_{ss}$ according to the following equation.

$u=(f_{gh}(n_s)+f_{ss})\bmod 30$ [Equation 10]

Where mod indicates modulo operation.

There are plural different (e.g. 17) hopping patterns and plural different (e.g. 30) sequence shift patterns. Sequence-group hopping can be enabled or disabled by a cell-specific parameter provided by higher layers.

according to Equation 11, but the sequence-shift pattern differs between PUCCH and PUSCH.

For PUCCH, the sequence-shift pattern $f_{ss}^{PUCCH}$ is given by the following equation based on the cell ID.

$f_{ss}^{PUCCH}=N_{ID}^{cell} \bmod 30$ [Equation 13]

A sequence shift pattern for a PUSCH $f_{ss}^{PUCCH}$ is given by the following equation using a sequence shift pattern $f_{ss}^{PUCCH}$ for a PUCCH and a value $(\Delta_{ss})$ configured by higher layers.

$f_{ss}^{PUSCH}=(f_{ss}^{PUCCH}+\Delta_{ss})\bmod 30$ [Equation 14]

In Equation 14, $\Delta_{ss} \in \{0, 1, \ldots, 29\}$.

Sequence hopping will now be described.

Sequence hopping only applies for reference signals of length $M_{sc}^{RS} \geq 6N_{sc}^{RB}$.

For reference signals of length $M_{sc}^{RS} < 6N_{sc}^{RB}$, the base sequence number v within the base sequence group is given by v=0.

For reference signals of length $M_{sc}^{RS} \geq 6N_{sc}^{RB}$, the base sequence number v within the base sequence group in slot $n_s$ is given by the following Equation 15.

$$v = \begin{cases} c(n_s) & \text{if group hopping is disabled and sequence hopping is enabled} \\ 0 & \text{otherwise} \end{cases} \quad \text{[Equation 15]}$$

Here, c(i) corresponds to the pseudo-random sequence and a parameter that is provided by higher layers and enables sequence hopping determines if sequence hopping is enabled or not. The pseudo-random sequence generator may be initialized with $C_{int}$ at the beginning of each radio frame.

$$c_{init} = \left\lfloor \frac{N_{ID}^{cell}}{30} \right\rfloor \cdot 2^5 + f_{ss}^{PUSCH} \quad \text{[Equation 16]}$$

Cyclic shift (CS) applied to all PUCCH formats shown in FIGS. 7 to 11 will hereinafter be described in detail. All PUCCH formats may use a cell-specific cyclic shift, $n_{cs}^{cell}(n_s, l)$, which varies with the symbol number l and the slot number $n_s$ according to the following equation.

$$n_{CS}^{cell}(n_s, l) = \Sigma_{i=0}^{7} c(8N_{symb}^{UL} \cdot n_s + 8l + i) \cdot 2^i \quad \text{[Equation 17]}$$

In Equation 17, the pseudo-random sequence c(i) may correspond to Equation 2, and may be initialized as shown in the following equation 18 whenever each radio frame begins.

$$c_{init} = N_{ID}^{cell} \quad \text{[Equation 18]}$$

In case of PUCCH format 1, necessary information can be transferred using specific information indicating the presence/absence of PUCCH received from the UE. In case of PUCCH format 1, it is assumed that a complex symbol d(0) is set to 1 (i.e., d(0)=1). In case of PUCCH formats 1a and 1b, one or two explicit bits can be transmitted, respectively. Blocks $b(0), \ldots, b(M_{bit}-1)$ of individual bits are modulated according to the following table 8, resulting in a complex symbol d(0).

TABLE 8

| PUCCH format | $b(0), \ldots, b(M_{bit} - 1)$ | d(0) |
|---|---|---|
| 1a | 0 | 1 |
|  | 1 | −1 |
| 1b | 00 | 1 |
|  | 01 | −j |
|  | 10 | j |
|  | 11 | −1 |

In association with each of P antenna ports to be used for PUCCH transmission, a sequence having a cyclic shift (CS) length of $N_{seq}^{PUCCH} = 12$ is multiplied by the complex symbol as shown in the following equation 19, resulting in creation of a cyclic-shifted complex symbol sequence.

$$y^{(\tilde{p})}(n) = \frac{1}{\sqrt{P}} d(0) \cdot r_{u,v}^{(\alpha_{\tilde{p}})}(n), \quad \text{[Equation 19]}$$
$$n = 0, 1, \ldots, N_{seq}^{PUCCH} - 1$$

$r_{u,v}^{(\alpha_{\tilde{p}})}(n)$ can be obtained in the same manner as in the case of $M_{sc}^{RS} = N_{seq}^{PUCCH}$ shown in Equation 5. An antenna-port specific cyclic shift $\alpha_{\tilde{p}}$ is changed according to symbols and slots (i.e., according to symbol numbers and slot numbers), and may be decided by the following equations 20 and 21.

[Equation 20]
$$\alpha_{\tilde{p}}(n_s, l) = 2\pi \cdot \bar{n}_{cs}^{(\tilde{p})}(n_s, l) / N_{sc}^{RB}$$

[Equation 21]
$$\bar{n}_{cs}^{(\tilde{p})}(n_s, l) = \begin{cases} \left[ n_{cs}^{cell}(n_s, l) + \left( \frac{n_{\tilde{p}}'(n_s) \cdot \Delta_{shift}^{PUCCH} +}{(\bar{n}_{oc}^{(\tilde{p})}(n_s) \bmod \Delta_{shift}^{PUCCH})} \right) \bmod N' \right] \bmod N_{sc}^{RB} & \text{for normal cyclic prefix} \\ \left[ n_{cs}^{cell}(n_s, l) + \left( \frac{n_{\tilde{p}}'(n_s) \cdot \Delta_{shift}^{PUCCH} +}{\bar{n}_{oc}^{(\tilde{p})}(n_s)} \right) \bmod N' \right] \bmod N_{sc}^{RB} & \text{for extended cyclic prefix} \end{cases}$$

[Equation 22]
$$\bar{n}_{oc}^{(\tilde{p})}(n_s) = \begin{cases} \lfloor n_{\tilde{p}}'(n_s) \cdot \Delta_{shift}^{PUCCH} / N' \rfloor & \text{for normal cyclic prefix} \\ 2 \cdot \lfloor n_{\tilde{p}}'(n_s) \cdot \Delta_{shift}^{PUCCH} / N' \rfloor & \text{for extended cyclic prefix} \end{cases}$$

In Equation 22, N' and c may be denoted by the following equation 23.

$$N' = \begin{cases} N_{cs}^{(1)} & \text{if } n_{PUCCH}^{(1,\tilde{p})} < c \cdot N_{cs}^{(1)} / \Delta_{shift}^{PUCCH} \\ N_{sc}^{RB} & \text{otherwise} \end{cases} \quad \text{[Equation 23]}$$

$$c = \begin{cases} 3 & \text{normal cyclic prefix} \\ 2 & \text{extended cyclic prefix} \end{cases}$$

In Equation 23, $\Delta_{shift}^{PUCCH}$ is a parameter received from a higher layer.

Blocks $y^{(\tilde{p})}(0), \ldots, y^{(\tilde{p})}(N_{seq}^{PUCCH}-1)$ of the above complex symbol are scrambled into $S(n_s)$, and is blockwise-spread as an antenna-port specific orthogonal sequence $w_{n_{oc}}^{(\tilde{p})}(i)$, and the set of complex symbols is generated through the following equation 24.

$$z^{(\tilde{p})}(m' \cdot N_{SF}^{PUCCH} \cdot N_{seq}^{PUCCH} + m \cdot N_{seq}^{PUCCH} + n) = \qquad \text{[Equation 24]}$$
$$S(n_s) \cdot w_{n_{oc}^{(\tilde{p})}}(m) \cdot y^{(\tilde{p})}(n)$$

In Equation 24, if $m=0, \ldots, N_{SF}^{PUCCH}-1$, $n=0, \ldots, N_{seq}^{PUCCH}-1$, and $m'=0, 1$ are given, $S(n_s)$ is denoted by the following equation 25.

$$S(n_s) = \begin{cases} 1 & \text{if } n'_{\tilde{p}}(n_s) \bmod 2 = 0 \\ e^{j\pi/2} & \text{otherwise} \end{cases} \qquad \text{[Equation 25]}$$

In case of both slots of general PUCCH formats 1/1a/1b, $N_{SF}^{PUCCH}=4$ is decided. In case of a first slot of shortened PUCCH formats 1/1a/1b, $N_{SF}^{PUCCH}=4$ is decided. In case of a second slot of the shortened PUCCH formats 1/1a/1b, $N_{SF}^{PUCCH}=3$ is decided. The orthogonal sequence $w_{n_{oc}}^{(\tilde{p})}(i)$ in case of $N_{SF}^{PUCCH}=4$ (shown in Table 9) is different from the orthogonal sequence $w_{n_{oc}}^{(\tilde{p})}(i)$ in case of $N_{SF}^{PUCCH}=3$ (shown in Table 10), as denoted by the following tables 9 and 10.

TABLE 9

| Sequence index $n_{oc}^{(\tilde{p})}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 10

| Sequence index $n_{oc}^{(\tilde{p})}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

In addition, resources for use in transmission of PUCCH formats 1/1a/1b are identified by a resource index $n_{PUCCH}^{(1,\tilde{p})}$. Resource indexes of two resource blocks for use in two slots of a subframe mapped to PUCCH are denoted by the following equation. Equation 26 may correspond to an even slot (i.e., $n_s$ mod 2=0), and Equation 27 may correspond to an odd slot (i.e., $n_s$ mod 2=1).

$$n'_{\tilde{p}}(n_s) = \begin{cases} n_{PUCCH}^{(1,\tilde{p})} & \text{if } n_{PUCCH}^{(1,\tilde{p})} < c \cdot N_{cs}^{(1)} / \Delta_{shift}^{PUCCH} \\ (n_{PUCCH}^{(1,\tilde{p})} - c \cdot N_{cs}^{(1)} / \Delta_{shift}^{PUCCH}) \bmod (c \cdot N_{sc}^{RB} / \Delta_{shift}^{PUCCH}) & \text{otherwise} \end{cases} \qquad \text{[Equation 26]}$$

$$n'_{\tilde{p}}(n_s) = \begin{cases} [c(n'_{\tilde{p}}(n_s - 1) + 1)] \bmod (cN_{sc}^{RB}/\Delta_{shift}^{PUCCH} + 1) - 1 & n_{PUCCH}^{(1,\tilde{p})} \geq c \cdot N_{cs}^{(1)} / \Delta_{shift}^{PUCCH} \\ \lfloor h_{\tilde{p}}/c \rfloor + (h_{\tilde{p}} \bmod c)N' / \Delta_{shift}^{PUCCH} & \text{otherwise} \end{cases} \qquad \text{[Equation 27]}$$

In this case, $h_{\tilde{p}}=(n'_{\tilde{p}}(n_s-1)+d) \bmod (cN'/\Delta_{shift}^{PUCCH})$ is given. In case of a normal CP, d=2 is decided. In case of an extended CP, d=0 is decided.

In case of PUCCH formats 2/2a/2b, blocks $b(0), \ldots, b(19)$ of individual bits are scrambled into a UE-specific scrambling sequence, and blocks $\tilde{b}(0), \ldots, \tilde{b}(19)$ of the scrambled bits are generated as shown in the following equation 28.

$$\tilde{b}(i)=(b(i)+c(i)) \bmod 2 \qquad \text{[Equation 28]}$$

In this case, the scrambling sequence (i.e., a pseudo-random sequence) may correspond to Equation 2, and the scrambling sequence generator is initialized as the following value $c_{init}$ whenever each subframe begins.

$$c_{init}=(\lfloor n_s/2 \rfloor + 1) \cdot (2N_{ID}^{cell}+1) \cdot 2^{16}+n_{RNTI} \qquad \text{[Equation 29]}$$

In Equation 29, $n_{RNTI}$ may correspond to C-RNTI.

Blocks $\tilde{b}(0), \ldots \tilde{b}(19)$ of the scrambled bits are QPSK-modulated, resulting in creation of complex modulation symbols $d(0), \ldots, d(9)$. The sequence $r_{u,v}^{(\alpha_{\tilde{p}})}(n)$ corresponding to the cyclic shift (CS) length ($N_{seq}^{PUCCH}=12$) for each of P antenna ports for PUCCH transmission is multiplied by the complex modulation symbols $d(0), \ldots, d(9)$, so that the following complex symbols can be generated as represented by Equation 30.

$$z^{(\tilde{p})}(N_{seq}^{PUCCH} \cdot n + i) = \frac{1}{\sqrt{P}} d(n) \cdot r_{u,v}^{(\alpha_{\tilde{p}})}(i) \qquad \text{[Equation 30]}$$

$n = 0, 1, \ldots, 9$ $i = 0, 1, \ldots, N_{sc}^{RB} - 1$ $r_{u,v}^{(\alpha_{\tilde{p}})}(i)$ can be obtained in the same manner as in the case of $M_{sc}^{RS}=N_{seq}^{PUCCH}$ shown in Equation 5.

Meanwhile, resources for PUCCH formats 2/2a/2b transmission are identified by the resource index $n_{PUCCH}^{(2,\tilde{p})}$ for deciding the cyclic shift (CS) $\alpha_{\tilde{p}}(n_s,l)$, as represented by the following equations.

$$\alpha_{\tilde{p}}(n_s,l)=2\pi \cdot n_{CS}^{(\tilde{p})}(n_s,l)/N_{sc}^{RB} \qquad \text{[Equation 31]}$$

$n_{cs}^{(\tilde{p})}(n_s,l)$ can be obtained through the following equation 32, and $N_{sc}^{RB}$ is identical to the size of a resource block, i.e., the number of subcarriers contained in a resource block.

$$n_{cs}^{(\tilde{p})}(n_s,l)=(n_{cs}^{cell}(n_s,l)+n'_{\tilde{p}}(n_s)) \bmod N_{sc}^{RB} \qquad \text{[Equation 32]}$$

In this case, $n'_p(n_s)$ is changed according to slots, and an even slot can be represented by the following equation 33.

$$n'_p(n_s) = \begin{cases} n_{PUCCH}^{(2,\tilde{p})} \bmod N_{sc}^{RB} & \text{if } n_{PUCCH}^{(2,\tilde{p})} < N_{sc}^{RB} N_{RB}^{(2)} \\ (n_{PUCCH}^{(2,\tilde{p})} + N_{cs}^{(1)} + 1) \bmod N_{sc}^{RB} & \text{otherwise} \end{cases}$$

[Equation 33]

In case of an odd slot, $n'_p(n_s)$ can be represented by the following equation 34.

$$n'_p(n_s) = \begin{cases} [N_{sc}^{RB}(n'_p(n_s-1)+1)] \bmod (N_{sc}^{RB}+1) - 1 & \text{if } n_{PUCCH}^{(2,\tilde{p})} < N_{sc}^{RB} N_{RB}^{(2)} \\ (N_{sc}^{RB} - 2 - n_{PUCCH}^{(2,\tilde{p})}) \bmod N_{sc}^{RB} & \text{otherwise} \end{cases}$$

[Equation 34]

UCI bits $b(20), \ldots, b(M_{bit}-1)$ for PUCCH formats 2a and 2b supported for the normal CP only are modulated as shown in the following table 11, so that a single modulation symbol d(10) for generating a reference signal (RS) for PUCCH formats 2a/2b is obtained.

TABLE 11

| PUCCH format | $b(20), \ldots, b(M_{bit}-1)$ | d(10) |
| --- | --- | --- |
| 2a | 0 | 1 |
|  | 1 | −1 |
| 2b | 00 | 1 |
|  | 01 | −j |
|  | 10 | j |
|  | 11 | −1 |

PUCCH Format 3 will now be described. If slot-level frequency hopping is not performed, the multiplexing capacity may be doubled again by further applying spreading or covering (e.g. Walsh covering) in slot units. If slot-level frequency hopping is performed, application of Walsh covering in slot units may not maintain orthogonality due to a channel condition experienced in each slot. A slot-level spreading code (e.g. OCC) for RSs may include, without being limited to, a Walsh cover of [x1 x2]=[1 1] or [1 −1] or linear transformation thereof (e.g. [j j] [j −j], [1 j] [1 −j], etc.). x1 is applied to the first slot and x2 is applied to the second slot. While figures show SC-FDMA symbol-level spreading (or covering) after slot-level spreading (or covering), a spreading (or covering) order may be changed.

The signal processing procedure of PUCCH Format 3 will now be described using equations. For convenience, it is assumed that a length-5 OCC is used.

The block of bits $b(0), \ldots, b(M_{bit}-1)$ is scrambled with a UE-specific scrambling sequence. The block of bits $b(0), \ldots, b(M_{bit}-1)$ may be corresponding to coded bits $b\_0$, $b\_1, b\_N-1$. The block of bits $b(0), \ldots, b(M_{bit}-1)$ includes at least one of ACK/NACK bit, CSI bit, SR bit. A block of scrambled bits $\tilde{b}(0), \ldots, \tilde{b}(M_{bit}-1)$ may be generated by the equation below.

$$\tilde{b}(i) = (b(i)+c(i)) \bmod 2$$

[Equation 35]

where c(i) denotes the scrambling sequence. c(i) includes pseudo-random sequences are defined by a length-31 Gold sequence and may be generated by the following equation where mod denotes the modulo operation.

The block of scrambled bits $\tilde{b}(0), \ldots, \tilde{b}(M_{bit}-1)$ is modulated, resulting in a block of complex-valued modulation symbols $d(0), \ldots, d(M_{symb}-1)$. When QPSK modulated, $M_{symb} = M_{bit}/2 = 2N_{sc}^{RB}$.

The complex-valued modulation symbols $d(0), \ldots, d(M_{symb}-1)$ are block-wise spread with the orthogonal sequence $w_{n_{oc}}(i)$ resulting in $N_{SF,0}^{PUCCH} + N_{SDF,1}^{PUCCH}$ sets of complex-valued symbols according to the following equation. The divide/spread procedure is performed by the following equation. Each complex-valued symbol is corresponding to an SC-FDMA symbol, and has $N_{sc}^{RB}$ complex-valued modulation values (e.g. 12 complex-valued modulation values).

$$y_n(i) = \begin{cases} w_{n_{oc},0}(\bar{n}) \cdot e^{j\pi\lfloor n_{cs}^{cell}(n_s,l)/64 \rfloor/2} \cdot d(i) & n < N_{SF,0}^{PUCCH} \\ w_{n_{oc},1}(\bar{n}) \cdot e^{j\pi\lfloor n_{cs}^{cell}(n_s,l)/64 \rfloor/2} \cdot d(N_{sc}^{RB}+i) & \text{otherwise} \end{cases}$$

[Equation 36]

$$\bar{n} = n \bmod N_{SF,0}^{PUCCH}$$

$$n = 0, \ldots, N_{SF,0}^{PUCCH} + N_{SF,1}^{PUCCH} - 1$$

$$i = 0, 1, \ldots, N_{sc}^{RB} - 1$$

Here, $N_{SF,0}^{PUCCH}$ and $N_{SF,1}^{PUCCH}$ correspond to the number of SC-FDMA symbols used for PUCCH transmission at slot 0 and slot 1, respectively. $N_{SF,0}^{PUCCH} = N_{SF,1}^{PUCCH} = 5$ for both slots in a subframe using normal PUCCH format 3 and $N_{SF,0}^{PUCCH} = 5$, $N_{SF,1}^{PUCCH} = 4$ holds for the first and second slot, respectively, in a subframe using shortened PUCCH format 3. $w_{n_{oc},0}(i)$ and $w_{n_{oc},1}(i)$ indicate orthogonal sequences applied to slot 0 and slot 1, respectively and are given by Table 12 shown below. $n_{oc}$ denotes an orthogonal sequence index (or an orthogonal code index). $\lfloor \rfloor$ denotes a flooring function. $n_{cs}^{cell}(n_s,l)$ may be given by Equation 17.

Table 12 shows a sequence index $n_{oc}$ and an orthogonal sequence $w_{n_{oc}}(i)$.

TABLE 12

| Sequence index $n_{oc}$ | Orthogonal sequence $[w_{n_{oc}}(0) \ldots w_{n_{oc}}(N_{SF}^{PUCCH}-1)]$ | |
| --- | --- | --- |
|  | $N_{SF}^{PUCCH} = 5$ | $N_{SF}^{PUCCH} = 4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |
| 4 | [1 $e^{j8\pi/5}$ $e^{j6\pi/5}$ $e^{j4\pi/5}$ $e^{j2\pi/5}$] | — |

Resources used for transmission of PUCCH formats 3 are identified by a resource index $n_{PUCCH}^{(3)}$. For example, $n_{oc}$ may be given by $n_{oc} = n_{PUCCH}^{(3)} \bmod N_{SF,1}^{PUCCH}$. $n_{PUCCH}^{(3)}$ may be indicated through a Transmit Power Control (TPC) field of an SCell PDCCH. More specifically, $n_{oc}$ for each slot may be given the following equation.

$$n_{oc,0} = n_{PUCCH}^{(3)} \bmod N_{SF,1}^{PUCCH}$$

[Equation 37]

$$n_{oc,1} = \begin{cases} (3n_{oc,0}) \bmod N_{SF,1}^{PUCCH} & \text{if } N_{SF,1}^{PUCCH} = 5 \\ n_{oc,0} \bmod N_{SF,1}^{PUCCH} & \text{otherwise} \end{cases}$$

where $n_{oc,0}$ denotes a sequence index value $n_{oc}$ for slot 0 and $n_{oc,1}$ denotes a sequence index value $n_{oc}$ for slot 1. In case of normal PUCCH Format 3, $N_{SF,0}^{PUCCH}=N_{SF,1}^{PUCCH}=5$. In case of shortened PUCCH Format 3, $N_{SF,0}^{PUCCH}=5$ and $N_{SF,1}^{PUCCH}=4$.

Each set of complex-valued symbols may be cyclically shifted according to following equation.

$$\tilde{y}_n(i)=y_n((i+n_{cs}^{cell}(n_s,l))\bmod N_{sc}^{RB}) \quad \text{[Equation 38]}$$

where $n_s$ denotes a slot number in a radio frame and l denotes an SC-FDMA symbol number in a slot. $n_{cs}^{cell}(n_s,l)$ is defined by Equation 17. $n=0, \ldots, N_{SF,0}^{PUCCH}+N_{SF,1}^{PUCCH}-1$.

The shifted sets of complex-valued symbols are transform precoded according to the following equation, resulting a block of complex-valued symbols $z(0), \ldots, z((N_{SF,0}^{PUCCH}+N_{SF,1}^{PUCCH})N_{sc}^{RB}-1)$.

$$z(n \cdot N_{sc}^{RB}+k) = \frac{1}{\sqrt{P}}\frac{1}{\sqrt{N_{sc}^{RB}}}\sum_{i=0}^{N_{sc}^{RB}-1}\tilde{y}_n(i)e^{-j\frac{2\pi ik}{N_{sc}^{RB}}} \quad \text{[Equation 39]}$$

$$k = 0, \ldots, N_{sc}^{RB}-1$$

$$n = 0, \ldots, N_{SF,0}^{PUCCH}+N_{SF,1}^{PUCCH}-1$$

Where P is the number of antenna ports used to transmit PUCCH. Complex symbol blocks $z(0), \ldots, z((N_{SF,0}^{PUCCH}+N_{SF,1}^{PUCCH})N_{sc}^{RB}-1)$ are mapped to physical resources after power control. A PUCCH uses one resource block in each slot of a subframe. In the resource block, $z(0), \ldots, z((N_{SF,0}^{PUCCH}+N_{SF,1}^{PUCCH})N_{sc}^{RB}-1)$ are mapped to a resource element (k,l) which is not used for RS transmission (see Table 14). Mapping is performed in ascending order of k, l, and a slot number, starting from the first slot of a subframe. k denotes a subcarrier index and l denotes an SC-FDMA symbol index in a slot.

A sequence $r^{(p)}_{PUCCH}(\cdot)$ of a UL RS of FIGS. 7 to 11 (hereinafter, a PUCCH DM RS) is given by $$r^{(p)}_{PUCCH}(m'N_{RS}^{PUCCH}M_{sc}^{RS}+mM_{sc}^{RS}+n)= \quad \text{[Equation 40]}$$

$$\frac{1}{\sqrt{P}}\bar{w}^{(p)}(m)z(m)r_{u,v}^{(\alpha_p,p)}(n)$$

In Equation 40, $m=0, \ldots, N^{PUCCH}_{RS}-1$, $n=0, \ldots, M^{RS}_{sc}-1$, and $m'=0, 1$. $N^{PUCCH}_{RS}$ is the number of reference symbols per slot for PUCCH. P is the number of antenna ports used for PUCCH transmission. The sequence $r^{(\alpha\_p)}_{u,v}(n)$ is given by Equation 5 with $M^{RS}_{sc}=12$ where the cyclic shift α_p is determined by the PUCCH format.

In more detail, in case of PUCCH formats 1/1a/1b, the cyclic shift (CS) is decided by the above equations 20 to 23, and the number $N_{RS}^{PUCCH}$ of reference signals (RSs) for each slot and the orthogonal sequence $\bar{w}(n)$ are shown in the following tables 13 and 14.

TABLE 13

| PUCCH format | Normal cyclic prefix | Extended cyclic prefix |
|---|---|---|
| 1, 1a, 1b | 3 | 2 |
| 2, 3 | 2 | 1 |
| 2a, 2b | 2 | N/A |

TABLE 14

| Sequence index $\bar{n}_{oc}(\tilde{p})(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

In case of PUCCH formats 2/2a/2b, the cyclic shift (CS) $\alpha_{\tilde{p}}(n_s,l)$ is decided by the above equations 31 to 34, the number $N_{RS}^{PUCCH}$ of RSs for each slot is decided by the above table 13, and the orthogonal sequence $\bar{w}(n)$ is shown in the following table 15.

TABLE 15

| Normal cyclic prefix | Extended cyclic prefix |
|---|---|
| [1 1] | [1] |

In case of PUCCH format 3, the cyclic shift (CS) $\alpha_{\tilde{p}}(n_s,l)$ is decided by the following equation 41.

$$\alpha_{\tilde{p}}(n_s,l)=2\pi \cdot n_{cs}^{(\tilde{p})}(n_s,l)/N_{sc}^{RB}$$

$$n_{cs}^{(\tilde{p})}(n_s,l)=(n_{cs}^{cell}(n_s,l)+n'_{\tilde{p}}(n_s))\bmod N_{sc}^{RB} \quad \text{[Equation 41]}$$

In Equation 41, $n'_{\tilde{p}}(n_s)$ is decided by the following table, and $n_{oc,0}^{(\tilde{p})}$ and $n_{oc,1}^{(\tilde{p})}$ are decided by the above equation 37.

TABLE 16

| | $n'_{\tilde{p}}(n_s)$ | |
|---|---|---|
| $n_{oc}(\tilde{p})$ | $N_{SF,1}=5$ | $N_{SF,1}=4$ |
| 0 | 0 | 0 |
| 1 | 3 | 3 |
| 2 | 6 | 6 |
| 3 | 8 | 9 |
| 4 | 10 | N/A |

In addition, the number $N_{RS}^{PUCCH}$ of RSs for each slot for DMRS of PUCCH format 3 is decided by the above table 13, and the orthogonal sequence $\bar{w}(n)$ is decided by Table 15.

A scaling factor $\beta_{PUCCH}$ is multiplied by the PUCCH DM RS sequence $r_{PUCCH}^{(\tilde{p})}(\cdot)$, and the resource element (k,l) on the antenna port (p) is mapped to a sequence beginning with $r_{PUCCH}^{(\tilde{p})}(0)$. The resource mapping is performed in ascending numerical order, i.e., the resource mapping is initially performed at the resource element (k) and then performed at the other resource element (l). Finally, the resource mapping is performed on the basis of the slot number.

UL frequency hopping may be applied to PUSCH shown in FIG. 12. If the UL frequency hopping is enabled by the predefined hopping pattern, the set of physical resources to be used for data transmission at the slot $n_s$ is given by the scheduling grant and the predefined pattern shown in the following table 42.

$$\tilde{n}_{PRB}(n_s) = \quad \text{[Equation 42]}$$

$$(\tilde{n}_{VRB}+f_{hop}(i)\cdot N_{RB}^{sb}+((N_{RB}^{sb}-1)-2(\tilde{n}_{VRB}\bmod N_{RB}^{sb})) \cdot$$

$$f_m(i))\bmod(N_{RB}^{sb}\cdot N_{sb})$$

$$i = \begin{cases} \lfloor n_s/2 \rfloor & \text{inter}-\text{subframe hopping} \\ n_s & \text{intra and inter}-\text{subframe hopping} \end{cases}$$

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}$$

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}$$

In Equation 42, $n_{VRB}$ is obtained from the scheduling grant, and the parameter "pusch-HoppingOffset" ($N_{RB}^{HO}$) is provided through higher layers. Each sub-band size $N_{RB}^{sb}$ can be represented by the following equation 43.

$$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases} \quad \text{[Equation 43]}$$

In Equation 43, the number $N_{sb}$ of sub-bands is given by higher layers. The above function $f_m(i) \in \{0,1\}$ may decide whether or not mirroring will be used.

The hopping function $f_{hop}(i)$ and the function $f_m(i)$ are represented by the following equations 44 and 45.

[Equation 44]

$$f_{hop}(i) = \begin{cases} 0 & N_{sb} = 1 \\ \left(f_{hop}(i-1) + \sum_{k=i\cdot 10+1}^{i\cdot 10+9} c(k) \times 2^{k-(i\cdot 10+1)}\right) \bmod N_{sb} & N_{sb} = 2 \\ \left(f_{hop}(i-1) + \left(\sum_{k=i\cdot 10+1}^{i\cdot 10+9} c(k) \times 2^{k-(i\cdot 10+1)}\right) \bmod (N_{sb}-1) + 1\right) \bmod N_{sb} & N_{sb} > 2 \end{cases}$$

[Equation 45]

$$f_m(i) = \begin{cases} i \bmod 2 & N_{sb} = 1 \text{ and intra and inter-subframe hopping} \\ \text{CURRENT\_TX\_NB} \bmod 2 & N_{sb} = 1 \text{ and inter-subframe hopping} \\ c(i \cdot 10) & N_{sb} > 1 \end{cases}$$

In this case, $f_{hop}(-1)=0$ is given, the pseudo-random sequence $c(i)$ is denoted by Equation 2, and CUR-RENT_TX_NB may indicate a transmit (Tx) number of a transmit (Tx) block to be transmitted at the slot $n_s$. The pseudo-random sequence generator may be initialized by the following equations whenever each frame begins.

$$c_{init} = N_{ID}^{cell}, \text{ in case of a frame structure type 1} \quad \text{[Equation 46]}$$

$$c_{init} = 2^9 \cdot (n_f \bmod 4) + N_{ID}^{cell}, \text{ in case of a frame structure type 2} \quad \text{[Equation 47]}$$

A PUSCH RS of FIG. 12 (hereinafter, PUSCH DM RS) is transmitted per layer. A PUSCH DM RS sequence $r^{(p)}_{PUSCH}(\cdot)$ associated with a layer $\lambda \in \{0, 1, \ldots, v-1\}$ is given by $$r_{PUSCH}^{(\lambda)}(m \cdot M_{sc}^{RS} + n) = w^{(\lambda)}(m) r_{u,v}^{*(\alpha\_\lambda)}(n) \quad \text{[Equation 48]}$$

In Equation 48, $m=0, 1, n=0, \ldots, M_{sc}^{RS}-1$, $M_{sc}^{RS} = M_{sc}^{PUSCH}$. $M_{sc}^{PUSCH}$ is scheduled bandwidth for UL transmission, expressed as a number of subcarriers. The orthogonal sequence $w^{(\lambda)}(m)$ may be given by Table 17 using the cyclic shift field in most recent UL-related DCI for the transport block associated with the corresponding PUSCH transmission. Table 7 shows an example mapping of cyclic shift field in UL-related DCI format to $n^{(2)}_{DMRS,\lambda}$ and $[w^{(\lambda)}(0)\ w^{(\lambda)}(1)]$.

TABLE 17

| Cyclic Shift Field in | $n^{(2)}_{DMRS,\lambda}$ | | | | $[w^{(\lambda)}(0)\ w^{(\lambda)}(1)]$ | | | |
|---|---|---|---|---|---|---|---|---|
| uplink-related DCI format | λ = 0 | λ = 1 | λ = 2 | λ = 3 | λ = 0 | λ = 1 | λ = 2 | λ = 3 |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

The cyclic shift $\alpha\_\lambda$ in slot $n_s$ is given as $2\pi n_{cs,\lambda}/12$, and $n_{cs,\lambda}$ is given by $$n_{cs,\lambda} = (n^{(1)}_{DMRS} + n^{(2)}_{DMRS,\lambda} + n_{PN}(n_s)) \bmod 12. \quad \text{[Equation 49]}$$

$n^{(1)}_{DMRS}$ is given by Table 8 according to cyclicShift provided by higher layers. Table 18 shows a mapping of cyclicShift given by higher layers to $n^{(1)}_{DMRS}$.

TABLE 18

| cyclicShift | $n^{(1)}_{DMRS}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

$n_{PN}(n_s)$ is given by the following equation using the cell-specific pseudo-random sequence c(i).

$$n_{PN}(n_s)=\Sigma_{i=0}^{7} c(8N_{symb}^{UL} \cdot n_s+i) \cdot 2^i \quad \text{[Equation 50]}$$

In Equation 50, the pseudo-random sequence c(i) is defined by Equation 2. The pseudo-random sequence generator is initialized with $c_{init}$ according to the following equation at the beginning of each radio frame.

$$c_{init} = \left\lfloor \frac{N_{ID}^{cell}}{30} \right\rfloor \cdot 2^5 + f_{ss}^{PUSCH} \quad \text{[Equation 51]}$$

In association with each antenna port used for PUSCH transmission, the PUSCH DM RS sequence $\tilde{r}_{PUSCH}^{(\tilde{p})}(\bullet)$ is multiplied by an amplitude scaling factor $\beta_{PUSCH}$, and is mapped to resource blocks with the sequence beginning with $\tilde{r}_{PUSCH}^{(\tilde{p})}(0)$. The mapping operation for the resource elements (k,l) may correspond to l=3 in case of the normal CP, and may correspond to l=2 in case of the extended CP. This mapping operation is initially performed at the index (k) within one subframe and then performed in ascending numerical order of slot numbers within one subframe.

Referring to Equations 1 to 4, in case of downlink, when the eNB generates a UE-specific RS to be transferred to a specific cell, the eNB may use the same physical layer cell ID $N_{ID}^{cell}$ for all UEs. In accordance with the current 3GPP LTE(-A) system, one UE receives a downlink signal within one cell, so that the UE must recognize one $N_{ID}^{cell}$ and one $n_{SCID}$ so as to detect its own UE-specific RS. Referring to Equations 12, 16, and the like, UEs located in one cell may initialize the pseudo-random sequence generator configured to generate the RS sequence using the same $N_{ID}^{cell}$. From the viewpoint of one UE, the UE needs to transmit the UL signal to only one cell, such that the UE may use only one $N_{ID}^{cell}$ so as to generate PUSCH DM RS, PUCCH DM RS, and SRS. That is, according to the legacy system in which a UE may receive a downlink signal within only one cell and may transmit an uplink signal to only one cell, cell (DL) and UE (UL)—based DM RS sequences have been used. In other words, a downlink cell and an uplink cell for use in the legacy communication system are identical to each other and the legacy communication system is designed to perform UL/DL transmission within only one cell, so that a UE may obtain $N_{ID}^{cell}$ on the basis of downlink synchronization signals (i.e., Primary Synchronization Signal (PSS) and Secondary Synchronization Signal (SSS)) having been received from a serving cell, and the obtained $N_{ID}^{cell}$ needs to be used for creation of UL/DL RS sequences.

Meanwhile, various methods for reducing access time between communication devices and performing communication with short latency are proposed in accordance with the requirement of a next generation communication system. As one of the methods, discussion on a method of transmitting data without a UL grant is in progress.

According to the present invention, a specific resource unit is configured and a plurality of transmission devices transmit a signal in the resource unit without resource allocation allocated by a UL grant. In this case, the resource unit where a plurality of the transmission devices are able to transmit a signal is referred to as a shared resource. A transmission type using the shared resource is referred to as a shared resource based transmission or a shared transmission. In particular, when a plurality of the transmission devices sharing a specific resource unit competitively transmit a signal, the present invention proposes a method of efficiently determining an RS for successfully transmitting a signal, a method of determining transmit power, and a method of quickly identifying a collision between a signal of a transmission device and a signal of a different device.

When signals are competitively transmitted, although a specific time/frequency resource is allocated to a single transmission device or signals are transmitted at the same time, since a resource is not allocated to a device capable of receiving all signals with a sufficiently high probability, when a specific device transmits a signal, a different device may transmit a signal at the same time. In this case, it is highly probable that it fails to receive the two signals due to serious interference between the signals.

In the following, as an example of the shared resource based transmission, a case that an eNB sets a specific time/frequency resource to a plurality of UEs and a plurality of the UEs transmit PUSCH in the shared resource is proposed to explain the operation of the present invention. In this case, a type that the specific time/frequency resource is shared with a different UE and PUSCH is transmitted in the resource is referred to as a shared resource based PUSCH transmission or a shared PUSCH transmission.

Specifically, if data to be transmitted by a shared PUSCH transmission occurs, each UE transmits the data by selecting a random resource or may initiate the transmission after an operation of detecting a transmission signal of a different UE. And, if data to be transmitted by the shared PUSCH transmission does not occur, PUSCH transmission is not performed in order not to provide interference to transmission of a different UE. According to a legacy operation, when a UE does not have data to transmit, if an eNB allocates a resource for PUSCH, zero-padded PUSCH is transmitted to identify whether or not the UE receives information on the resource allocated by the eNB. In particular, the shared PUSCH transmission is different from the legacy operation. Yet, this is just an embodiment only. It is apparent that the present invention can be applied to a shared resource based transmission or shared transmission of a different type as well. For example, the present invention can also be applied to a case that a UE transmits a signal to a different UE (e.g., sidelink transmission or D2D transmission) and a transmission resource is determined based on a shared resource or a shared scheme.

The eNB can transmit resource configuration information for performing a shared transmission to the UE. In this case, time/frequency resources set by the eNB may correspond to a resource pool. When the UE performs a shared transmission, it may be able to regulate the shared transmission to be performed using the whole of the resource pool all the time. Or, it may be able to regulate the resource pool to be divided into a plurality of resource units according to a prescribed criterion and PUSCH to be transmitted using one or a plurality of resource units.

In the following, when a shared PUSCH transmission is performed, a method of enhancing communication efficiency is explained.

Method of Determining RS Sequence

When a shared resource based transmission is performed, a plurality of UEs may select the same resource unit and transmit PUSCH using the resource unit. This is referred to as a resource collision. In this case, although each PUSCH received by an eNB has lower SINR due to mutual interference, if a reference signal in use is different, it may still be able to receive the PUSCH. Specifically, when an eNB has a plurality of reception antennas, if a plurality of UEs of sufficiently low channel correlation transmit PUSCH to the same resource using a different RS sequence, the eNB can successfully receive each PUSCH via a MU-MIMO technique by considering the PUSCH transmission as multi-antenna transmission. Although a resource collision occurs in a shared resource based PUSCH transmission, if UEs use a different RS sequence and channel correlation of the UEs is low, since it becomes identical to a MU-MIMO situation, the eNB can receive a plurality of PUSCHs at the same time.

In order to obtain the abovementioned effect, the present invention proposes a shared PUSCH transmission scheme that an eNB sets a plurality of RS sequences to a resource pool and a UE transmits PUSCH by selecting not only a resource unit but also an RS sequence to be used by the UE.

Figure 13:
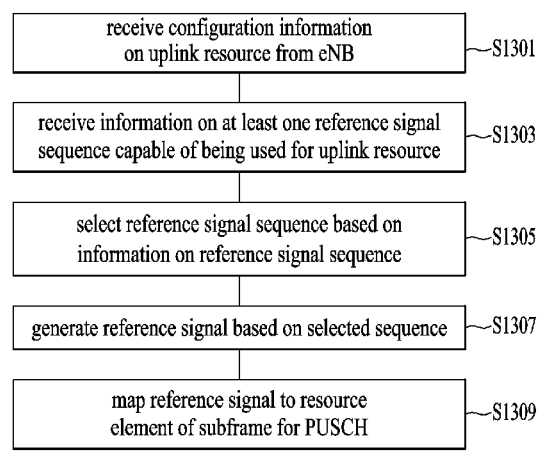
FIG. 13 illustrates a method of determining an RS sequence for transmitting shared PUSCH according to one embodiment of the present invention.

FIG. 13 illustrates a method of determining an RS sequence for transmitting shared PUSCH according to one embodiment of the present invention.

Referring to FIG. 13, an eNB can transmit resource configuration information for performing a shared resource based transmission to a UE [S1301]. As mentioned in the foregoing description, time/frequency resources configured by the eNB may correspond to a resource pool. The eNB can transmit information on at least one reference signal (RS) sequence capable of being used for the resource pool [S1303]. In this case, the at least one RS sequence may correspond to an RS sequence set. The UE selects an RS sequence to be used for the resource pool [S1305], generates an RS using the selected RS sequence [S1307], and maps the RS to a resource element belonging to a resource unit or a plurality of resource units for PUSCH [S1309]. In FIG. 13, although the resource unit is represented by a subframe, this is just an example only. The scope of the present invention is not restricted to the example.

A method for the UE to select an RS sequence described in the step S1305 is explained through various embodiments in the following. In this case, the UE can select an RS sequence using a combination of one or more embodiments described in the following.

As one embodiment, simply, the eNB sets a plurality of RS sequences and the UE can randomly select one from among a plurality of the RS sequences.

In the following, a method of configuring a plurality of RS sequences mentioned earlier in the step S1303 is explained in more detail.

An eNB can configure a set of RS sequences, more specifically, a set of parameters to be used for generating an RS sequence. For example, the eNB can configure a set of a virtual cell ID, a cyclic shift (CS) parameter, and an orthogonal sequence cover (OCC) to be utilized for generating the aforementioned PUSCH DM RS.

The number of sequences capable of being selected by a UE may vary according to the number of reception antennas available in each cell, a sectorization level of each cell (e.g., an angle processed by a cell as a signal reception region of a UE, a level of angle of arrival (AOA)), a correlation level of a reception antenna and a UE channel, strength of external interference, and the like. For example, if a cell has many reception antennas, correlation of a UE channel is low, or external interference is weak, it may be advantageous that many numbers of RS sequences are configured to maximize the aforementioned effect of the MU-MIMO. On the contrary, in case of the opposite case, since the MU-MIMO effect is low, it may be advantageous that the less number of RS sequence is configured to reduce implementation complexity due to blind detection of the eNB and a false detection problem. Hence, the eNB configures an appropriate RS sequence in accordance with a situation of each cell and makes UEs select the RS sequence transmitted from a resource pool.

A method of configuring a plurality of RS sequences according to an RS sequence configuration scheme is explained based on various embodiments. In this case, it may be able to configure a plurality of the RS sequences based on a combination of one or more embodiments.

As an embodiment, RS sequences can be configured using a higher layer signal such as RRC. This scheme corresponds to a method of semi-statically configuring RS sequences capable of being selected by a UE in each resource pool. In this case, since the frequency of RRC signaling is low, overhead is not a big problem. Hence, an eNB may designate an available RS sequence. For example, the eNB can designate an available OCC or CS and/or a set of virtual cell IDs.

This signaling for configuring a plurality of RS sequences can be transmitted as a part of configuration of a resource pool. In particular, in FIG. 13, the step S1301 and the step S1303 can be performed as a single step. When the present principle is applied, in order to guarantee that UEs different from each other use a different RS sequence, the eNB may designate a different set to a different UE while the RRC signaling is transmitted to each UE. In this case, each set may include a single sequence only.

As a different embodiment for the method of configuring a plurality of RS sequences, a plurality of the RS sequences can be configured using a PDCCH-based physical layer signal. This scheme corresponds to a method of dynamically configuring RS sequences capable of being selected by a UE in each resource pool. According to the present scheme, since an eNB is able to dynamically designate a set of RSs to be used in accordance with a situation, it may be able to more adaptively operate for a situation change.

In this case, since the signaling frequency is high, overhead may become a problem. Hence, the eNB designates a specific index using the less number of bits via PDCCH and determines an available RS sequence via an index and a predetermined rule.

For example, while two fields are transmitted via PDCCH, one field designates an index of a parent set of available RS sequences and another field designates the number of RS sequences practically available in the parent set. For example, the first field is configured in a manner of being similar to a CS field of a legacy DCI format by reusing the rule described in Table 6 to determine a set of CS and OCC parameter. Then, if the number of RS sequences is signaled by X using the second field, a UE may select one from among $\lambda=0, 1, \ldots, X-1$ in a corresponding Table. Of course, in order to more reduce overhead of PDCCH, it may signal either the field designating the parent set or the field designating the number of RS sequences via RRC.

The RS sequence signaling can be transmitted as a part of signaling (via PDCCH) that designates a resource pool. In this case, in order to guarantee that UEs different from each other use a different RS sequence, the eNB may designate a different set to a different UE while the physical layer signal is transmitted to each UE. In this case, each set may include a single sequence only.

Although it is not depicted in FIG. 13, it may further include the step of scrambling a reference signal and a physical channel. In this case, it may be able to further include the steps of selecting a scrambling sequence, and scrambling the reference signal and data using the selected scrambling sequence. In the following, when a UE selects a different RS sequence, a method of performing scrambling is explained.

When UEs different from each other select a different RS sequence, it is preferable that an information bit transmitted by each of the UEs also uses different scrambling. When two UEs transmit a similar information bit string, if a final transmission modulation symbol is differentiated, it may be able to obtain an interference randomization effect, i.e., an effect of preventing an interference signal having a form similar to a form of a desired signal from being maintained for prescribed time. For example, it may include a case of transmitting a bit string to which zero-padding is commonly applied by higher layer.

Specifically, when a PUSCH transmission signal is generated, if a parameter interlocked with a sequence parameter transmitted by a UE is included in an initial value of a sequence generator that scrambles an information bit, PUSCH using a different reference signal sequence may use a different sequence as well.

For example, it may add an offset value determined by a parameter of an RS to an initialization value of a scrambling sequence used in general PUSCH transmission.

As a different example, if C-RNTI is already assigned to a UE transmitting a shared PUSCH, scrambling can be performed using the C-RNTI to separate a scrambling sequence between different UEs. This method has a merit in a shared PUSCH transmission which is designed based on a legacy SPS.

In the following, an operation of a shared PUSCH transmission, which is designed based on a legacy SPS, is explained.

For example, a parameter of the shared PUSCH is forwarded to a UE in advance via higher layer signaling such as RRC signaling and then transmission permission can be initiated according to an activation message transmitted via PDCCH. In this case, for example, the parameter of the shared PUSCH may correspond to a period and/or a subframe offset value in time where a shared PUSCH resource appears.

In this case, activation PDCCH can be CRC scrambled using a common ID (e.g., a C-RNTI separately designated for the shared PUSCH) to enable a plurality of UEs to monitor the activation PDCCH to reduce PDCCH overhead of an eNB. If the shared PUSCH of the UE is also scrambled by the same ID, the aforementioned problem may occur. Hence, the shared PUSCH itself can be configured to be scrambled by a C-RNTI assigned to an individual UE.

In this case, in order to enable a plurality of UEs to detect the activation PDCCH together, the activation PDCCH can be regulated to be transmitted in a common search space. In this case, in order to distinguish the activation PDCCH from a different PDCCH in the common search space, such an ID as the C-RNTI for the shared PUSCH can be separately assigned and the ID can be used for CRC scrambling. And, a release message for terminating the shared PUSCH transmission can also be transmitted to the common search space to control all UEs at a time.

Or, in order to control an individual UE while performing activation and release common to UEs, it may be able to regulate PDCCH for the shared PUSCH to be transmitted in both the common search space and a UE-specific search space. In this case, it may be able to regulate an ID value (e.g., a value used for CRC scrambling) used in each search space to be the same and regulate a starting (E)CCE index in a search space to be different only.

As mentioned in the foregoing description, if the shared PUSCH is designed based on the legacy SPS, it may reuse legacy SPS configuration signaling information transmitted by the eNB and add an additional field. In particular, the additional field can include an indicator indicating whether or not the shared PUSCH transmission is applied. If the indicator is set to 'true', it may be able to regulate such an operation as selecting a random resource, detecting a signal of a different UE, and/or not transmitting PUSCH if there is no data, and the like to be additionally performed.

Referring back to the step S1305, a method of selecting an RS sequence is explained in the following embodiments.

In order to more enhance MU-MIMO effect, an RS sequence can be selected in consideration of a measurement value of a DL channel. For example, if total available RS sequences are divided into a plurality of sets, it may be able to select a specific set from among a plurality of the sets in consideration of a DL channel measurement value. Subsequently, an RS sequence can be selected from the specific set. Specifically, when a UE transmitting shared PUSCH measures a DL channel, if a measured value satisfies a specific condition, an RS sequence can be selected from a set connected with the condition. Since there is a similarity of a certain level between a DL channel and a UL channel, when UEs are laid in a situation capable of easily performing spatial separation due to a different attribute of a DL channel, if the UEs transmit shared PUSCH to the same resource using a different RS, the aforementioned operation assumes that it is highly probable to achieve the MU-MIMO effect.

As a specific example of the DL channel measurement, there is angle of arrival (AOA) of a DL RS. In particular, if the AOA belongs to a specific region, a UE selects an RS sequence from a sequence set interlocked with the specific region. When a similarity exists in the AOA between a DL channel and a UL channel, if a UE including different AOA transmits PUSCH to the same resource using a different RS, since it is able to easily perform spatial separation, reception success probability can be enhanced.

As a different specific example of the DL channel measurement, there is a preferred PMI which is calculated in a process of reporting CSI for PDSCH. In particular, if a UE measures a DL channel and selects a specific PMI as a preferred PMI based on a result of the DL channel measurement, an RS sequence can be selected from a set interlocked with the preferred PMI. In this case, if it is assumed that shared PUSCH is generally transmitted by rank 1, the preferred PMI, which is measured to select an RS sequence set, can be restricted to a rank 1 PMI.

As a further different specific example of the DL channel measurement, there is reception power of a CRS or a CSI-RS. If a network sets a plurality of CRSs or CSI-RSs, a UE measures reception power of each of a plurality of the CRSs or the CSI-RSs, selects a CRS and a CSI-RS of strongest reception power, and selects an RS sequence from a sequence set interlocked with the CRS and the CSI-RS.

In this case, each of a plurality of the CRSs can be transmitted from a different cell. A part of a plurality of the CSI-RSs can be transmitted from a different transmission/ reception point having the same cell ID. In particular, when a UE is located near cells or transmission/reception points different from each other, it may have an effect that the UE transmits shared PUSCH using a different RS sequence. When PUSCH has a different target reception eNB or a different reception point, if the PUSCH uses a different RS sequence, it may be able to enhance reception success probability.

Of course, when reception power of a CRS or CSI-RS is compared with reception power of another CRS or CSI-RS, if a prescribed bias value is added, it may be able to provide a weight value to a specific cell or a reception point. Although a cell or a point has a weak reception signal according to the actual distribution of UEs, if there is less UE near the cell of the point, it may provide a high bias to the cell or the point to make more UEs target the cell or the point, thereby reducing a probability of collision.

Or, a part of the CSI-RSs can be transmitted in a manner that the same transmission/reception point assigns a different precoding. In this case, if a UE selects a different CSI-RS as a CSI-RS of the maximum reception power, it indicates that an optimized precoder is different in the aspect of DL. Due to the similarity between the DL channel and the UL channel, channel correlation is low in UL as well. Hence, the effect of the MU-MIMO can be enhanced.

As a different example, in case of a CSI-RS set to a UE (Rel-13 UE) supporting FD-MIMO, the CSI-RS may operate as follows. In case of a UE to which class A is set, the UE can determine and transmit a precoder based on the reception of a signal on which precoding is not performed. On the contrary, in case of a UE to which class B is set, the UE selects a precoder based on a CSI-RS on which beamforming is performed. It may assume a case that a UE performing a shared resource based operation is configured by the class B (i.e., a CSI process based on a beamformed CSI-RS) and K (>1) number of NZP CSI-RS resources are set to the UE. In this case, the UE can select a CSI-RS corresponding to a preferred CSI-RS resource indicator (CRI) calculated by a CSI derivation process. Moreover, the UE can be defined/configured to perform an operation of selecting the RS sequence from a sequence set interlocked with the CSI-RS. Similarly, if the UE selects a different CSI-RS as a preferred CRI, it may indicate that an optimized precoder is different in the aspect of DL. Due to the similarity between the DL channel and the UL channel, channel correlation is low in UL as well. Hence, the effect of the MU-MIMO can be enhanced.

Meanwhile, if an RS sequence used by an individual UE is not appropriately controlled among a plurality of UEs, two UEs of a low MU-MIMO effect may continuously use a sequence of high correlation, thereby increasing time delay. In general, if delay spread of a channel is big, two RS sequences including a less difference between CS parameters have big mutual correlation in the aspect of a reception eNB. In this case, if the two UEs attempt the shared PUSCH transmission using the CS parameter of a less difference via the channel of which the delay spread is relatively big, it is highly probable that the two messages fail. Moreover, if delay spread of a channel of a corresponding UE is not reduced, since there is a possibility of using the CS parameter of less difference in a next transmission, transmission of an urgent message may consistently fail.

In order to solve the problem, an RS sequence parameter used by each UE can be changed by a predetermined scheme over time. In particular, the parameter can be changed over time in a manner of being interlocked with a UE ID such as C-RNTI. For example, assume that a CS corresponding to an RS sequence parameter used by a UE is selected from among 4 values including 0, 3, 6, and 9.

In this case, For example, a CS value used by each UE can be represented as 3*mod(f(n, ID), 4). In this case, n corresponds to an index of a subframe and f(n, ID) corresponds to $n^{th}$ output of a pseudo random function derived from a UE ID.

As a different example, a CS used by a UE can be implemented in a form of continuously adding a prescribed offset to an initial value. In this case, each UE may have a different initial value and an offset value. Of course, an operation of setting a limit on a final CS parameter within a prescribed region, e.g., an operation of performing modulo calculation using maximum CS parameter number, can be added. For example, when a CS parameter is defined in regions ranging from 0 to 12, a CS parameter used by a UE may have a form such as mod (init+n*offset, 12). In this case, init corresponds to an initial value and offset corresponds to an offset value. If a CS parameter is restricted to 0, 3, 6, and 9, it may have a value from among 0, 3, 6, and 9.

As a further different example, if a specific pattern is set to each UE, it may be able to prevent a parameter collision between UEs and it may be able to design a different UE having a maximum CS parameter interval at every instance. If a pattern described in the following is applied to the example of using the CS parameters 0, 3, 6, and 9, it may have the abovementioned effect.

Pattern 0: 0→0→0
Pattern 1: 3→6→9
Pattern 2: 6→9→3
Pattern 3: 9→3→6

As a characteristic of the aforementioned example, a pattern 0 corresponding to a specific parameter is repeated. In a different pattern, a parameter increases by 3. If the parameter becomes 12, the parameter is returned to 3 again. By doing so, a pattern having a CS interval of 6 becomes patterns 0 and 2 and patterns 1 and 3 at the first timing, becomes patterns 0 and 1 and patterns 2 and 3 at the second timing, and becomes patterns 0 and 3 and patterns 1 and 2 at the third timing. As a result, all patterns have a CS interval of 6.

Although UEs select a different RS sequence, an eNB may fail to receive messages transmitted by a partial UE or all UEs according to a channel status. In this case, it is necessary for the UEs to retransmit the message. In the following, a method for UEs to retransmit a message is explained through various embodiments. If a UE using a different RS sequence uses a different resource according to the methods described in the following to retransmit the message, it may be able to increase a success rate of each message.

Figure 14:
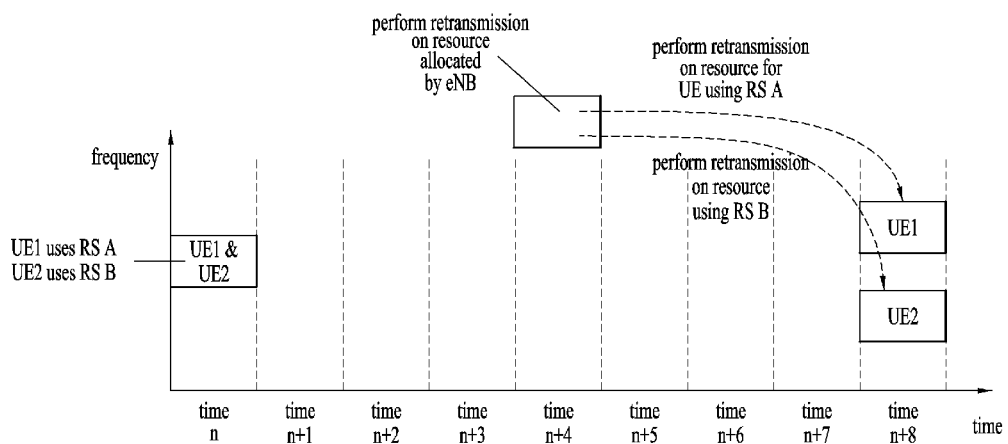
FIG. 14 illustrates an example for a method of configuring an RS sequence for retransmission according to a different embodiment of the present invention.

FIG. 14 illustrates an example for a method of configuring an RS sequence for retransmission according to a different embodiment of the present invention.

Referring to FIG. 14, it may use a method designated by an eNB as a method of configuring an RS sequence to be used for retransmission. In particular, an eNB indicates allocation of a resource for retransmission and designates an RS sequence, which is going to use the resource.

In particular, the eNB designates a specific RS sequence to a retransmission resource allocation message and makes a UE, which has performed transmission using the designated RS sequence, use the retransmission resource only.

Referring to FIG. 14, a UE1 and a UE2 respectively attempt initial transmission in the same resource using an RS sequence A and an RS sequence B at the timing n and an eNB designates a retransmission resource corresponding to each of the RS sequences at the timing n+4.

The retransmission resource can be allocated as follows. A plurality of retransmission resources are designated in a single message and each of a plurality of the retransmission resources can be associated with an RS sequence. Or, a plurality of messages can be transmitted in a state that a retransmission resource and an RS sequence associated with the retransmission resource are designated in a message.

Figure 15:
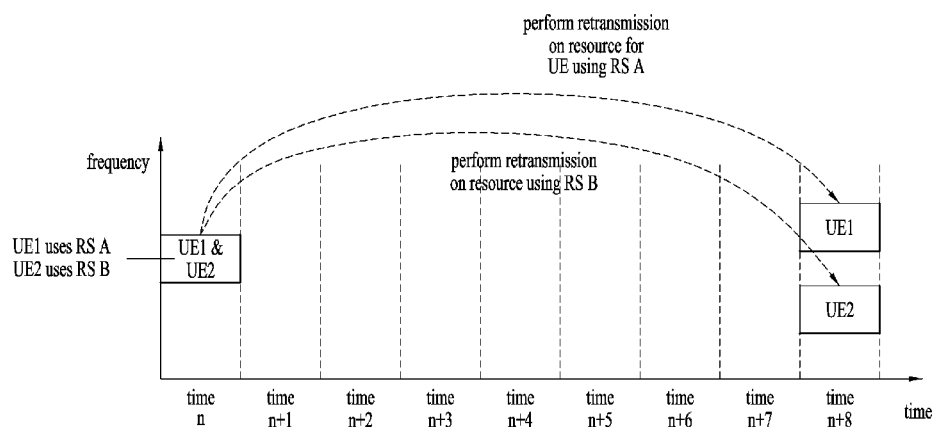
FIG. 15 illustrates a different example for a method of configuring an RS sequence for retransmission according to a different embodiment of the present invention.

FIG. 15 illustrates a different example for a method of configuring an RS sequence for retransmission according to a different embodiment of the present invention.

Referring to FIG. 15, initial transmission using a specific resource can be mapped to a different retransmission resource according to an RS sequence used for the initial transmission. If retransmission is necessary, a UE uses a retransmission resource which is mapped to an RS sequence used by the UE according to a predetermined rule. In this case, it may have a merit in that it is not necessary for an eNB to designate a retransmission resource to be used by a UE using an individual RS sequence one by one.

For example, when a frequency resource x is used for initial transmission at the timing t, retransmission is performed at the timing t+T. In case of using an RS sequence 1 a frequency resource y1 is used. In case of using an RS sequence 2 a frequency resource y2 is used. In particular, a mapping rule is determined in advance. For example, in case of using an $n^{th}$ RS sequence, a retransmission frequency resource can be provided in a form such as $y_n=(x+n) \bmod M$. In this case, the M corresponds to the total number of frequency resources.

Referring to FIG. 15, a UE1 and a UE2 respectively attempt initial transmission in the same resource using an RS sequence A and an RS sequence B at the timing t and an initial transmission resource at the timing n is mapped to a retransmission resource at the timing n+8. In this case, the UE1 uses the RS sequence A in the initial transmission resource and uses a retransmission resource interlocked or mapped to the RS sequence A at the timing n+8. Similarly, the uE2 uses the RS sequence B in the initial transmission and uses a retransmission resource interlocked or mapped to the RS sequence B at the timing n+8.

Meanwhile, a plurality of UEs may use the same RS sequence at the initial transmission. In this case, in order to make a different UE select a different resource at retransmission, it may be able to extend a retransmission resource in the embodiment of FIG. 14 or FIG. 15 to make the retransmission resource include a plurality of resources rather than a single resource. A UE may use a set of retransmission resources determined by an RS sequence used by the UE according to the allocation of retransmission resource allocated by the eNB (FIG. 14) or a predetermined mapping relation (FIG. 15). In this case, for example, the UE randomly selects a partial resource from among the set and use the selected resource for actual retransmission. In order to obtain additional MU-MIMO effect, an RS sequence used for retransmission can be determined in a manner of being different from initial transmission (e.g., according to random selection).

Determining Shared PUSCH and Transmit Power

In the following, when shared PUSCH is used, a method of controlling transmit power is explained. When a shared PUSCH transmission is performed, it is difficult for an eNB to control transmit power of an individual UE one by one. This is because, since the reason of using the shared PUSCH is to reduce time for accessing the eNB and overhead thereof, if individual power is controlled, the advantage of the shared PUSCH is disappeared. Hence, it is preferable that the shared PUSCH is performed without controlling individual transmit power.

In particular, in order to enjoy the aforementioned effect of MU-MIMO, it is preferable that the eNB receives PUSCH transmission of each UE with similar power as much as possible. To this end, it may be able to configure open loop power control to be applied to the shared PUSCH only. In particular, transmit power of the shared PUSCH can be determined by adding a component proportional to a pathloss with the eNB to specific reference power.

Yet, since it is necessary to control overall transmit power of the shared PUSCH due to external interference of a cell, and the like, if the eNB dynamically signals power control indication to all UEs participating in the shared PUSCH, it may be able to control power to be increased or decreased in a prescribed level in addition to the aforementioned open loop power control. Since the power control indication corresponds to a single indication commonly applied to a UE group participating in the shared PUSCH, the power control indication can be referred to as a UE group power control indication.

A UE can control transmit power according to urgency or priority of a message. Compared to other UEs, a specific UE may transmit a more urgent message through the shared PUSCH. In this case, the specific UE may use higher power to transmit the message. If the specific UE uses higher power, although a different UE transmits a signal at the same time, since the power arrived at an eNB is higher, a signal of the specific UE is able to overcome interference from the signal transmitted by the different UE and can be properly received by the eNB.

In particular, when the shared PUSCH is performed, it may permit a power offset of a certain level according to urgency of a message. In particular, the power offset can be interlocked with an RS sequence used for transmission. When a specific power offset is applied, if a specific RS sequence is used, two shared PUSCHs including a different urgency and different reception power in an eNB may use the same RS sequence. By doing so, it may be able to prevent RS collision and smoothly perform channel estimation, thereby more efficiently receiving urgent data.

As an example of the urgent data, there is a retransmitted data. Since the retransmitted data has already experienced prescribed time delay in a previous transmission procedure, it may be necessary to more quickly transmit the retransmitted data. Of course, the aforementioned power offset can be applied irrespective of the urgency of data. In this case, a UE can randomly select a power offset from among available power offsets.

Collision Detection Method of UE

In the following, when a UE supporting a FDR (full duplex radio) system performs a shared PUSCH, a method of detecting a collision and performing an operation in response to the collision is explained.

Meanwhile, if a UE performing a shared PUSCH or a sharing based transmission is equipped with a full duplex function and is able to receive a signal of a different UE at the timing of transmitting a signal of the UE, this can be utilized for determining whether or not the shared transmission is successful.

Specifically, when the UE transmits a shared PUSCH in a specific resource, if a signal of a different UE is detected with high power after a signal of the UE is eliminated from a resource unit in which the transmission of the UE is performed, this can be regarded as a resource collision. In this case, whether or not a resource collision occurs can also be determined by an RS sequence used by the UE.

Specifically, when reception power of a different RS sequence usable in a resource pool is measured after the signal of the UE is eliminated, although the same power is measured, if an RS highly correlated with an RS used by the UE is detected, it is determined as it is difficult to use MU-MIMO and it is regarded as a collision. If an RS less correlated with the RS used by the UE is detected, since there is a possibility of MU-MIMO, it is not regarded as a collision. For example, if reception power of each RS sequence is equal to or greater than a prescribed criterion, it is regarded as a collision. As a correlation with an RS sequence used by the UE for transmission is bigger, it may configure the criterion to be lower.

In addition, in case of applying the aforementioned power offset, a UE may interlock a criterion of a collision with a power offset used by the UE. In particular, when a UE uses a higher power offset, although a signal of a different UE of a high collision level is detected, the UE can determine that it is highly probable for an eNB to succeed in receiving a signal of the UE due to the power offset of the UE. Hence, if the UE uses the high power offset, the UE may increase an RS reception power value corresponding to a collision criterion.

And, when a power offset is interlocked with an RS sequence in use according to the description about the power offset, the interlocking relation can be usefully utilized. For example, if an RS sequence interlocked with a high power offset is detected, since it is highly probable that reception power of a corresponding signal is high in an eNB, a probability of receiving a signal of a UE is more lowered. In order to reflect this, a reference value for determining whether or not a collision occurs can be more lowered for the RS sequence, i.e., the power offset.

When a specific UE performs transmission, if the specific UE determines that a collision occurs in the transmission, the specific UE can reduce overall signal transmission delay by performing a more immediate action. For example, when a UE determines a collision, the UE may immediately attempt retransmission of PUSCH using a different resource without waiting for a separate signal from an eNB. On the contrary, if the UE determines that a collision does not occur, the UE may not attempt unnecessary retransmission while waiting for signaling of an eNB that signals whether or not a signal of the UE is detected. By doing so, it may be able to more promptly initiate retransmission due to a collision and reduce interference due to unnecessary retransmission.

A method for an eNB to permit a shared resource based transmission can be mainly performed by two types. As a first type, the eNB forms a resource pool for PUSCH and a UE immediately transmits data to be transmitted by the UE in the resource pool in a PUSCH form. Since immediate transmission can be performed via the first type, it may have a merit in that it is able to minimize latency until data transmission. However, it may also have a demerit in that possibility of collision of data transmission itself is increasing. In this case, the principle of the present invention can be applied to the PUSCH immediately transmitted by the UE.

As a second type, the UE can transmit a predetermined signal (this is referred to as a message 1) to an eNB before PUSCH is transmitted to inform the eNB of the necessity of a shared PUSCH transmission. If the eNB forwards a signal (this is referred to as a message 2) for permitting the shared PUSCH transmission to the UE, the UE can transmit data via PUSCH (this is referred to as a message 3) according to the permission signal.

In this case, in general, a resource for the message 1 is configured to be smaller than a resource for the message 3. Moreover, the message 1 is generated by a predetermined special sequence to identify a data transmission collision with a small amount of resource before the data transmission collision occurs.

The present invention can be applied to the PUSCH transmitted in the message 3. In this case, a resource pool for the PUSCH can be designated by the message 2. In the abovementioned operation, when the message 3 is transmitted, the principle of the present invention can be applied. This is because, since two UEs are able to transmit the same message 1, an eNB designates a set of available RS sequences while designating a resource pool in the message 2 and a UE randomly selects a sequence or selects a sequence by applying a combination of one or more embodiments to transmit the message 3. Then, the eNB can successfully receive the message 3 transmitted by the two UEs at the same time with a prescribed probability.

In addition, the combination of one or more embodiments of the present invention can also be applied to the signal transmission transmitted in the message 1. For example, a method for a UE to determine an RS sequence of PUSCH or transmit power according to the aforementioned various conditions and a collision detection method for detecting a signal of a different UE can also be applied to the message 1. Similarly, it may be able to perform collision detection by determining a sequence of the message 1 to be used by a UE in each situation, determining transmit power of the sequence, or detecting the message 1 of a different UE.

In particular, a scheme of exchanging the message 1 and the message 2 before PUSCH is transmitted can be used for an initial access procedure of a UE initially accessing an eNB. In this case, in order to enhance efficiency of the initial access, it may be able to determine a sequence, transmit power, and a transmission resource of the message 1 using a combination of one or more embodiments of the present invention.

In the following, a method of determining a sequence of the message 1 is explained in detail using the aforementioned embodiments for better understanding of the method used for an initial access procedure.

As mentioned in the foregoing description, a random access process is divided into a contention-based process and a dedicated (i.e., non-contention-based) process. A UE randomly selects a RACH preamble sequence in the contention-based random access process. Hence, a plurality of UEs can transmit the same RACH preamble sequence at the same time. In this case, a message for transmitting the RACH preamble sequence or a RACH preamble is referred to as a message 1.

As one embodiment of the present invention, a RACH preamble sequence can be selected by using a method of selecting a reference signal sequence rather than randomly selecting the RACH preamble sequence. For example, it may be able to select a preamble sequence based on a channel measurement result. In this case, for clarity, a case of selecting a preamble sequence based on a channel measurement result is explained, by which the present invention may be non-limited.

An eNB designates shared PRACH resources capable of transmitting an available preamble sequence to a UE and designates a set of total preamble sequences. In this case, the aforementioned method can be identically applied to a method of designating shared PRACH resources and a method of designating a sequence set.

The UE selects a PRACH transmission resource from among the shared PRACH resources and selects a preamble sequence to be used for the selected PRACH transmission resource.

The UE can select the preamble sequence in consideration of a measurement value of a DL channel. For example, if total available preamble sequences are divided into a plurality of sets, the UE can select a specific set from among a plurality of the sets in consideration of a DL channel measurement value. Specifically, if a UE transmitting a shared PRACH measures a DL channel and a measured value satisfies a specific condition, the UE can select a preamble sequence from a sequence set connected with the condition. As a different example, the UE may select a specific sequence from the total preamble sequences in consideration of a DL channel measurement value instead of using set division. If a UE transmitting a shared PRACH measures a DL channel and a measured value satisfies a specific condition, the UE can select a preamble sequence connected with the condition.

In the following, selecting a preamble sequence is explained based on an example of using AOA among DL RS measurement results.

A UE measures AOA of a DL RS. If the AOA belongs to a specific region, the UE can select a preamble sequence from a sequence set interlocked with the specific region or a sequence interlocked with the specific region. In this case, when a similarity exists in the AOA between a DL channel and a UL channel, if a UE including a different AOA transmits PRACH to the same resource using a different RS, since it is able to easily perform spatial separation, reception success probability can be enhanced.

As mentioned in the foregoing description, although a DL channel measurement result is explained based on the embodiment of using AOA among DL RS measurement results, different embodiments of the present invention such as reception power of a PMI, a CRS, or a CSI-RS, and the like are not restricted by the embodiment.

Similarly, when the shared PRACH is transmitted using the aforementioned embodiment or a combination of one or more embodiments of the present invention, it may be able to terminate the PRACH transmission or retransmit the PRACH by determining transmit power or detecting a collision.

Figure 16:
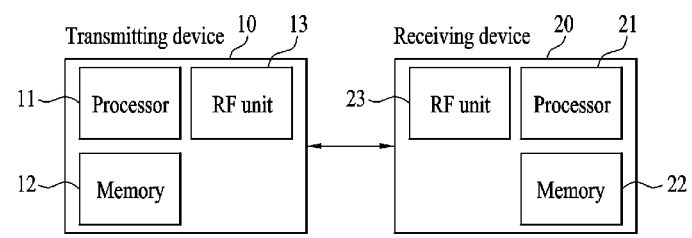
FIG. 16 is a block diagram illustrating elements of a transmitting device 10 and a receiving device 20 for implementing the present invention.

FIG. 16 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL.

The above eNB processor and UE processor may be configured in such a manner that the above-described various embodiments of the present invention may be implemented independently or in combination of two or more.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

What is claimed is:

1. A method of transmitting a signal by a user equipment (UE) based on a shared resource capable of being shared with a different UE in a wireless communication system, the method comprising:
receiving configuration information on the shared resource from a base station;
generating a reference signal for transmitting uplink data;
scrambling the reference signal and the data using a specific scrambling sequence; and
transmitting the reference signal for transmitting the uplink data of the shared resource by mapping the reference signal to a resource unit,
wherein the reference signal is generated based on a specific sequence belonging to a reference signal sequence set designated for the shared resource,
wherein the specific scrambling sequence is interlocked with the specific sequence for the reference signal,
wherein the specific scrambling sequence is generated based on a value obtained by applying a prescribed offset to an initial value of a scrambling sequence, and
wherein the prescribed offset is determined based on a parameter for generating the specific sequence.

2. The method of claim 1, further comprising:
receiving information on the reference signal sequence set.

3. The method of claim 1, wherein the specific sequence is randomly selected from the reference signal sequence set.

4. The method of claim 1, further comprising:
receiving a reference signal for measuring a channel from the base station; and
performing channel measurement based on the received reference signal,
wherein the specific sequence is determined based on a result of the channel measurement.

5. The method of claim 4, wherein the result of the channel measurement is represented by at least one selected from AOA (angle of arrival), a precoding matrix indicator (PMI), and reception power.

6. The method of claim 1, wherein a parameter for generating the specific sequence changes with a prescribed pattern over time.

7. The method of claim 1, wherein a parameter for generating the specific sequence is determined by adding a prescribed offset to an initial value over time.

8. The method of claim 1, wherein a parameter for generating the specific sequence is determined based on a pseudo random function.

9. The method of claim 1, wherein the resource unit is not mapped to the reference signal for transmitting the uplink data of the shared resource if there is no data to transmit.

10. The method of claim 1, wherein the reference signal sequence set is configured by at least one selected from a set of virtual cell IDs, a set of cyclic shift parameters, and a set of orthogonal sequence covers.

11. A method of receiving a signal by a base station based on a shared resource in a wireless communication system, the method comprising:
transmitting configuration information on the shared resource to a user equipment (UE); and
receiving a reference signal and data transmitted in a specific resource unit of the shared resource from the UE,
wherein the reference signal is generated based on a specific sequence belonging to a reference signal sequence set designated for the shared resource,
wherein the reference signal is scrambled using a specific scrambling sequence interlocked with the specific sequence for the reference signal,
wherein the specific scrambling sequence is generated based on a value obtained by applying a prescribed offset to an initial value of a scrambling sequence, and
wherein the prescribed offset is determined based on a parameter for generating the specific sequence.

12. A user equipment (UE) transmitting a signal based on a shared resource capable of being shared with a different UE in a wireless communication system, the UE comprising:
a transceiver configured to transmit or receive a signal; and
a processor configured to control the transceiver, to receive configuration information on the shared resource from an base station, to generate a reference signal for transmitting uplink data, to scramble the reference signal and the data using a specific scrambling sequence, and to control the transceiver to transmit the reference signal for transmitting the uplink data of the shared resource to the base station by mapping the reference signal to a resource unit,
wherein the reference signal is generated based on a specific sequence belonging to a reference signal sequence set designated for the shared resource,
wherein the specific scrambling sequence is interlocked with the specific sequence for the reference signal,
wherein the specific scrambling sequence is generated based on a value obtained by applying a prescribed offset to an initial value of a scrambling sequence, and
wherein the prescribed offset is determined based on a parameter for generating the specific sequence.

13. A base station receiving a signal based on a shared resource in a wireless communication system, the base station comprising:
a transceiver configured to transmit or receive a signal; and
a processor configured to control the transceiver, to transmit configuration information on the shared resource to a user equipment, and to receive a reference signal and data transmitted in a specific resource unit of the shared resource from the user equipment, wherein the reference signal is generated based on a specific sequence belonging to a reference signal sequence set designated for the shared resource, wherein the reference signal is scrambled using a specific scrambling sequence interlocked with the specific sequence for the reference signal, wherein the specific scrambling sequence is generated based on a value obtained by applying a prescribed offset to an initial value of a scrambling sequence, and wherein the prescribed offset is determined based on a parameter for generating the specific sequence.

* * * * *